United States Patent
Pacholok et al.

(10) Patent No.: US 7,808,211 B2
(45) Date of Patent: Oct. 5, 2010

(54) SYSTEM AND METHOD FOR CHARGING BATTERIES

(75) Inventors: David R. Pacholok, Sleepy Hollow, IL (US); Thomas Finis Johnson, Schaumburg, IL (US); Xiao Ping Chen, Buffalo Grove, IL (US)

(73) Assignee: Schumacher Electric Corporation, Mt. Prospect, IL (US)

( * ) Notice: Subject to any disclaimer, the term of this patent is extended or adjusted under 35 U.S.C. 154(b) by 0 days.

(21) Appl. No.: 12/415,337

(22) Filed: Mar. 31, 2009

(65) Prior Publication Data

US 2009/0206796 A1   Aug. 20, 2009

Related U.S. Application Data

(62) Division of application No. 10/925,073, filed on Aug. 24, 2004, now Pat. No. 7,528,579.

(60) Provisional application No. 60/514,407, filed on Oct. 23, 2003.

(51) Int. Cl.
  *H02J 7/04* (2006.01)
  *H02J 7/06* (2006.01)
  *H02J 1/00* (2006.01)
(52) U.S. Cl. .................... 320/140; 320/157; 363/15
(58) Field of Classification Search ............ 320/140, 320/157
See application file for complete search history.

(56) References Cited

U.S. PATENT DOCUMENTS

| | | |
|---|---|---|
| 707,699 A | 8/1902 | Hutchison |
| 2,565,273 A | 8/1951 | Shuler et al. |
| 2,659,042 A | 11/1953 | Anderson et al. |
| 3,267,452 A | 8/1966 | Wolf |
| 3,293,529 A | 12/1966 | Fontaine |
| 3,341,762 A | 9/1967 | Rockoff |
| 3,343,057 A | 9/1967 | Smith |

(Continued)

FOREIGN PATENT DOCUMENTS

CN   2085106   9/1991

(Continued)

OTHER PUBLICATIONS

Int'l Search Report PCT/US04/32412.

(Continued)

*Primary Examiner*—Edward Tso
*Assistant Examiner*—Yalkew Fantu
(74) *Attorney, Agent, or Firm*—John S. Paniaguas; Katten Muchin Rosenman LLP

(57) ABSTRACT

A high frequency battery charger includes a converter, drive logic, and control logic. The converter transforms a DC voltage into a high frequency AC voltage. The drive logic controls a conversion of the high frequency AC voltage through a train of pulses. The control logic adjusts the output of the converter to maximize a charging cycle of a battery. The method of transforming an AC input into a direct current output used to charge a rechargeable battery includes transforming an AC input into a first DC output; transforming the first DC output into a high frequency AC output; transforming the high frequency AC output into a second DC output; and passing a charging current to an external load when the load is correctly connected to an output.

7 Claims, 16 Drawing Sheets

U.S. PATENT DOCUMENTS

| | | |
|---|---|---|
| 3,454,859 A | 7/1969 | Ford et al. |
| 3,500,167 A | 3/1970 | Appelgate et al. |
| 3,564,393 A | 2/1971 | Williamson |
| 3,617,850 A | 11/1971 | Domshy |
| 3,629,704 A | 12/1971 | Stevens |
| 3,652,915 A | 3/1972 | Eberts |
| 3,659,182 A | 4/1972 | Snedeker |
| 3,659,183 A | 4/1972 | Carlson |
| 3,673,485 A | 6/1972 | Vital et al. |
| 3,679,964 A | 7/1972 | Nowell |
| 3,729,637 A | 4/1973 | Gray |
| 3,781,631 A | 12/1973 | Nelson et al. |
| 3,787,754 A | 1/1974 | Seabase |
| 3,816,806 A | 6/1974 | Mas |
| 3,852,732 A | 12/1974 | Yorksie et al. |
| 3,873,911 A | 3/1975 | Champlin |
| 3,886,442 A | 5/1975 | Chiku et al. |
| 3,886,443 A | 5/1975 | Miyakawa et al. |
| 3,895,284 A | 7/1975 | Schweizer et al. |
| 3,909,708 A | 9/1975 | Champin |
| 3,911,350 A | 10/1975 | Swope |
| 3,938,018 A | 2/1976 | Dahl |
| 3,940,679 A | 2/1976 | Brandwein et al. |
| 3,971,980 A | 7/1976 | Jungfer et al. |
| 3,997,830 A | 12/1976 | Newell et al. |
| 4,021,717 A | 5/1977 | Furuishi et al. |
| 4,031,449 A | 6/1977 | Trombly |
| 4,044,300 A | 8/1977 | Dupuis et al. |
| 4,045,717 A | 8/1977 | Fallon et al. |
| 4,061,956 A | 12/1977 | Brown et al. |
| 4,065,712 A | 12/1977 | Godard et al. |
| 4,079,303 A | 3/1978 | Cox |
| 4,145,648 A | 3/1979 | Zender |
| 4,209,736 A | 6/1980 | Reidenbach |
| 4,215,306 A | 7/1980 | Mace |
| 4,225,815 A | 9/1980 | Lind et al. |
| 4,260,943 A | 4/1981 | Zaderej et al. |
| 4,302,714 A | 11/1981 | Yefsky |
| 4,361,795 A | 11/1982 | Santilli |
| 4,374,355 A | 2/1983 | Steigerwald et al. |
| 4,376,263 A | 3/1983 | Pittroff et al. |
| 4,423,378 A | 12/1983 | Marino et al. |
| 4,459,548 A | 7/1984 | Lentz et al. |
| 4,549,127 A | 10/1985 | Taylor et al. |
| 4,564,800 A | 1/1986 | Jurjans |
| 4,571,533 A | 2/1986 | Dey |
| 4,583,034 A | 4/1986 | Martin |
| 4,584,514 A | 4/1986 | Kaminski |
| 4,607,208 A | 8/1986 | Vreeland |
| 4,638,236 A | 1/1987 | Carr et al. |
| 4,654,573 A | 3/1987 | Rough et al. |
| 4,654,575 A | 3/1987 | Castleman |
| 4,667,141 A | 5/1987 | Steele |
| 4,670,703 A | 6/1987 | Williams |
| 4,672,295 A | 6/1987 | Poninski |
| 4,692,681 A | 9/1987 | Nilssen |
| 4,697,134 A | 9/1987 | Burkum et al. |
| 4,710,694 A | 12/1987 | Sutphin et al. |
| 4,716,353 A | 12/1987 | Engelmann |
| 4,734,635 A | 3/1988 | Theobald |
| 4,742,290 A | 5/1988 | Sutphin et al. |
| 4,745,349 A | 5/1988 | Palanisamy et al. |
| 4,746,854 A | 5/1988 | Baker et al. |
| 4,772,874 A | 9/1988 | Hasegawa |
| 4,816,768 A | 3/1989 | Champlin |
| 4,825,170 A | 4/1989 | Champlin |
| 4,847,545 A | 7/1989 | Reid |
| 4,871,959 A | 10/1989 | Gali |
| 4,876,496 A | 10/1989 | Duncan |
| 4,881,038 A | 11/1989 | Champlin |
| 4,899,270 A | 2/1990 | Bond |
| 4,902,955 A | 2/1990 | Manis et al. |
| 4,912,416 A | 3/1990 | Champlin |
| 4,929,931 A | 5/1990 | McCuen |
| 4,968,941 A | 11/1990 | Rogers |
| 4,994,728 A | 2/1991 | Sasaki |
| 5,013,992 A | 5/1991 | Eavenson et al. |
| 5,043,650 A | 8/1991 | Bhagwat et al. |
| 5,049,803 A | 9/1991 | Palanisamy |
| 5,063,341 A | 11/1991 | Gali |
| 5,083,076 A | 1/1992 | Scott |
| 5,084,664 A | 1/1992 | Gali |
| 5,113,127 A | 5/1992 | Hoffman et al. |
| 5,140,269 A | 8/1992 | Champlin |
| 5,153,496 A | 10/1992 | LaForge |
| 5,159,272 A | 10/1992 | Rao et al. |
| 5,160,880 A | 11/1992 | Palanisamy |
| 5,166,595 A | 11/1992 | Leverich |
| 5,189,359 A | 2/1993 | Kronberg |
| 5,192,905 A | 3/1993 | Karlin et al. |
| 5,196,780 A | 3/1993 | Pacholok |
| 5,198,743 A | 3/1993 | McClure et al. |
| 5,254,930 A | 10/1993 | Daly |
| 5,270,635 A | 12/1993 | Hoffman et al. |
| 5,276,393 A | 1/1994 | Gali |
| 5,281,904 A | 1/1994 | Tomkins |
| 5,371,454 A | 12/1994 | Marek |
| 5,371,456 A | 12/1994 | Brainard |
| 5,382,893 A | 1/1995 | Dehnel |
| 5,387,871 A | 2/1995 | Tsai |
| 5,397,991 A | 3/1995 | Rogers |
| 5,412,306 A | 5/1995 | Meadows et al. |
| 5,442,274 A | 8/1995 | Tamai |
| 5,444,353 A | 8/1995 | Shinohara et al. |
| 5,451,880 A | 9/1995 | Yamagishi et al. |
| 5,459,671 A | 10/1995 | Duley |
| 5,475,294 A | 12/1995 | Isoda |
| 5,483,144 A | 1/1996 | Marek |
| 5,491,399 A | 2/1996 | Gregory et al. |
| 5,510,694 A | 4/1996 | Nilssen |
| 5,528,148 A | 6/1996 | Rogers |
| 5,541,495 A | 7/1996 | Gali |
| 5,563,496 A | 10/1996 | McClure |
| 5,563,802 A | 10/1996 | Plahn et al. |
| 5,572,110 A | 11/1996 | Dunstan |
| 5,581,171 A | 12/1996 | Kerfoot et al. |
| 5,594,318 A | 1/1997 | Nor et al. |
| 5,596,974 A | 1/1997 | Hall et al. |
| 5,598,085 A | 1/1997 | Hasler |
| 5,600,227 A | 2/1997 | Smalley |
| 5,600,230 A | 2/1997 | Dunstan |
| 5,616,968 A | 4/1997 | Fujii et al. |
| 5,617,007 A | 4/1997 | Keidl et al. |
| 5,621,302 A | 4/1997 | Shinohara |
| 5,633,575 A | 5/1997 | Gali |
| 5,635,816 A | 6/1997 | Welsh et al. |
| 5,637,978 A | 6/1997 | Kellett et al. |
| 5,646,507 A | 7/1997 | Timmons et al. |
| 5,659,237 A | 8/1997 | Divan et al. |
| 5,659,240 A * | 8/1997 | King .......................... 320/134 |
| RE35,643 E | 10/1997 | Gali |
| 5,677,612 A | 10/1997 | Campagnuolo et al. |
| 5,677,615 A | 10/1997 | Takano et al. |
| 5,680,031 A | 10/1997 | Pavlovic |
| 5,684,686 A | 11/1997 | Reddy |
| 5,686,815 A | 11/1997 | Reipur et al. |
| 5,696,436 A | 12/1997 | Kim et al. |
| 5,701,089 A | 12/1997 | Perkins |
| 5,710,506 A | 1/1998 | Broell et al. |
| 5,773,955 A | 6/1998 | Hall |
| 5,777,457 A | 7/1998 | Lee |
| 5,790,391 A | 8/1998 | Stich et al. |
| 5,793,185 A | 8/1998 | Prelec et al. |
| 5,798,630 A | 8/1998 | Sugimori et al. |

| | | |
|---|---|---|
| 5,820,407 A | 10/1998 | Morse et al. |
| 5,844,384 A | 12/1998 | Hamm et al. |
| 5,933,049 A | 8/1999 | Melse |
| 5,949,213 A | 9/1999 | Lanni |
| 5,949,640 A | 9/1999 | Cameron et al. |
| 5,965,998 A | 10/1999 | Whiting et al. |
| 5,977,750 A | 11/1999 | Ng et al. |
| 5,982,138 A | 11/1999 | Krieger |
| 5,982,143 A | 11/1999 | Stuart |
| 5,998,970 A | 12/1999 | Ishimaru et al. |
| 6,018,227 A | 1/2000 | Kumar et al. |
| 6,021,052 A | 2/2000 | Unger et al. |
| 6,025,697 A | 2/2000 | Long et al. |
| 6,028,426 A | 2/2000 | Cameron et al. |
| 6,037,745 A | 3/2000 | Koike et al. |
| 6,057,665 A | 5/2000 | Herniter et al. |
| 6,068,513 A | 5/2000 | Cameron et al. |
| 6,072,299 A | 6/2000 | Kurle et al. |
| 6,081,098 A | 6/2000 | Bertness et al. |
| 6,087,802 A | 7/2000 | James |
| 6,091,245 A | 7/2000 | Bertness |
| 6,100,664 A | 8/2000 | Oglesbee et al. |
| 6,104,167 A | 8/2000 | Bertness et al. |
| 6,111,389 A | 8/2000 | Aranovich et al. |
| 6,118,251 A | 9/2000 | Atwater |
| 6,118,254 A | 9/2000 | Faulk |
| 6,121,756 A | 9/2000 | Johnson, Jr. et al. |
| 6,130,519 A | 10/2000 | Whiting et al. |
| 6,175,510 B1 | 1/2001 | Loh |
| 6,184,650 B1 | 2/2001 | Gelbman |
| 6,184,653 B1 | 2/2001 | Wu |
| 6,204,630 B1 | 3/2001 | James |
| 6,204,639 B1 | 3/2001 | Takano et al. |
| 6,211,577 B1 | 4/2001 | Alksnat et al. |
| 6,215,273 B1 | 4/2001 | Shy |
| 6,222,343 B1 | 4/2001 | Crisp et al. |
| D442,912 S | 5/2001 | Krieger |
| 6,225,808 B1 | 5/2001 | Varghese et al. |
| 6,229,279 B1 | 5/2001 | Kierker |
| 6,232,750 B1 | 5/2001 | Podrazhansky et al. |
| 6,239,996 B1 | 5/2001 | Perreault et al. |
| D444,122 S | 6/2001 | Krieger |
| 6,252,373 B1 | 6/2001 | Stefansson et al. |
| 6,310,481 B2 | 10/2001 | Bertness |
| 6,313,608 B1 | 11/2001 | Varghese et al. |
| 6,316,914 B1 | 11/2001 | Bertness |
| 6,320,358 B2 | 11/2001 | Miller |
| 6,323,650 B1 | 11/2001 | Bertness et al. |
| 6,326,765 B1 | 12/2001 | Hughes et al. |
| 6,331,762 B1 | 12/2001 | Bertness |
| 6,344,729 B1 | 2/2002 | Chiang |
| 6,344,733 B1 | 2/2002 | Crass et al. |
| 6,351,102 B1 | 2/2002 | Troy |
| 6,356,050 B1 | 3/2002 | Hussaini |
| 6,363,303 B1 | 3/2002 | Bertness |
| 6,370,039 B1 | 4/2002 | Telefus |
| 6,377,029 B1 | 4/2002 | Krieger et al. |
| D456,988 S | 5/2002 | Krieger et al. |
| 6,384,573 B1 | 5/2002 | Dunn |
| 6,388,425 B1 | 5/2002 | Petrovic |
| D462,320 S | 9/2002 | Krieger et al. |
| 6,456,035 B1 | 9/2002 | Crisp et al. |
| 6,456,044 B1 | 9/2002 | Darmawaskita |
| 6,456,514 B1 | 9/2002 | Perreault et al. |
| D464,620 S | 10/2002 | Krieger et al. |
| 6,495,992 B1 | 12/2002 | Pavlovic |
| D475,680 S | 6/2003 | Krieger et al. |
| 6,577,517 B2 | 6/2003 | Jain et al. |
| D483,326 S | 12/2003 | Krieger et al. |
| D486,787 S | 2/2004 | Krieger et al. |
| D491,139 S | 6/2004 | Krieger et al. |
| D491,141 S | 6/2004 | Krieger et al. |
| D493,421 S | 7/2004 | Krieger et al. |
| D493,422 S | 7/2004 | Krieger et al. |
| D493,770 S | 8/2004 | Krieger et al. |
| D494,537 S | 8/2004 | Krieger et al. |
| 2001/0004205 A1 | 6/2001 | Miller |
| 2001/0019257 A1 | 9/2001 | Bynum et al. |
| 2002/0050805 A1 | 5/2002 | Petrovic |
| 2002/0060552 A1 | 5/2002 | Harada et al. |
| 2002/0109485 A1 | 8/2002 | Wu |
| 2003/0141845 A1 * | 7/2003 | Krieger et al. ............... 320/132 |
| 2003/0201734 A1 | 10/2003 | Krieger et al. |

FOREIGN PATENT DOCUMENTS

| | | |
|---|---|---|
| JP | 06-105408 | 4/1994 |
| JP | 07-031068 | 1/1995 |
| JP | 08-111906 | 4/1996 |
| JP | 09-285027 | 10/1997 |
| WO | WO 01/82446 | 1/2001 |
| WO | WO 03/065537 | 8/2003 |
| WO | WO 03/065541 | 8/2003 |
| WO | WO 03/071648 | 8/2003 |
| WO | WO 03/088466 | 10/2003 |
| WO | WO 03/090497 | 10/2003 |
| WO | WO 03/096135 | 11/2003 |
| WO | WO 2004/036714 | 4/2004 |

OTHER PUBLICATIONS

Oman, H., "9$^{th}$ Annual Battery Conference on Advance and Applications," IEEE AES Systems Magazine, Apr. 1994, pp. 25-31.

Sari, Z et al., "Design and Implementation of a Microprocessor Based High Frequency Switching Mode Power Supply." The European Power Electronics Association, 1993, pp. 334-337.

Kassick, E.V. et al. "A Low Cost High Power Factor Resonant Mode Battery Charger," IEEE, 1993, pp. 543-548.

Latos. T., "Battery Charger and State of Charge Indicator (Final Report)," Gould Research Center, Apr. 15, 1984, pp. 1-252.

Acton, R., "High-Frequency Charging,"Electric Vehicles, vol. 70, No. 4, Dec. 1984, pp. 21-26.

Chinski, P., "A Line-Frequency Low-Cost Lead-Acid Battery Charger", PCIM 2001 Power Electronics Conference, Inertech Publishing, Stamford, CT, Sep. 2001, p. 464-70.

Hayes, J.G. et al. "Wide-Load Range Resonant Converter Supplying the SAE J-1773 Electric Vehicle Inductive Charging Interface", IEEE Transactions on Industry Applications, vol. 35, No. 4, IEEE Jul.-Aug. 1999, pp. 884-895.

Harada, K. et al., "Non-Contact Charging For Electric Vehicles," PMEC '96. 7$^{th}$ International Power Electronics and Motion Control Conference, Exhibition, Tutorials, Proceedings, vol. 3, Tech. University Budapest, 1996, pp. 45-50.

Suzuki, Y. et al., "An Approach to the AC to AC/DC Converter," Eighteenth International Telecommunications Energy Conference (At. No. 96CH35965), IEEE, New York, 1996, pp. 434-441.

Laszlo Balogh, Implementing Multi-State Charge Algorithm with the UC3909 Switchmode Lead-Acid Battery Charger Controller, Unitrode Corporation, 1999.

George C. Chryssis, High Frequency Switching Power Supplies—Theory & Design 1-12, 109-31, 133-81, 183-208, 209-31 (2$^{nd}$ ed. 1989).

* cited by examiner

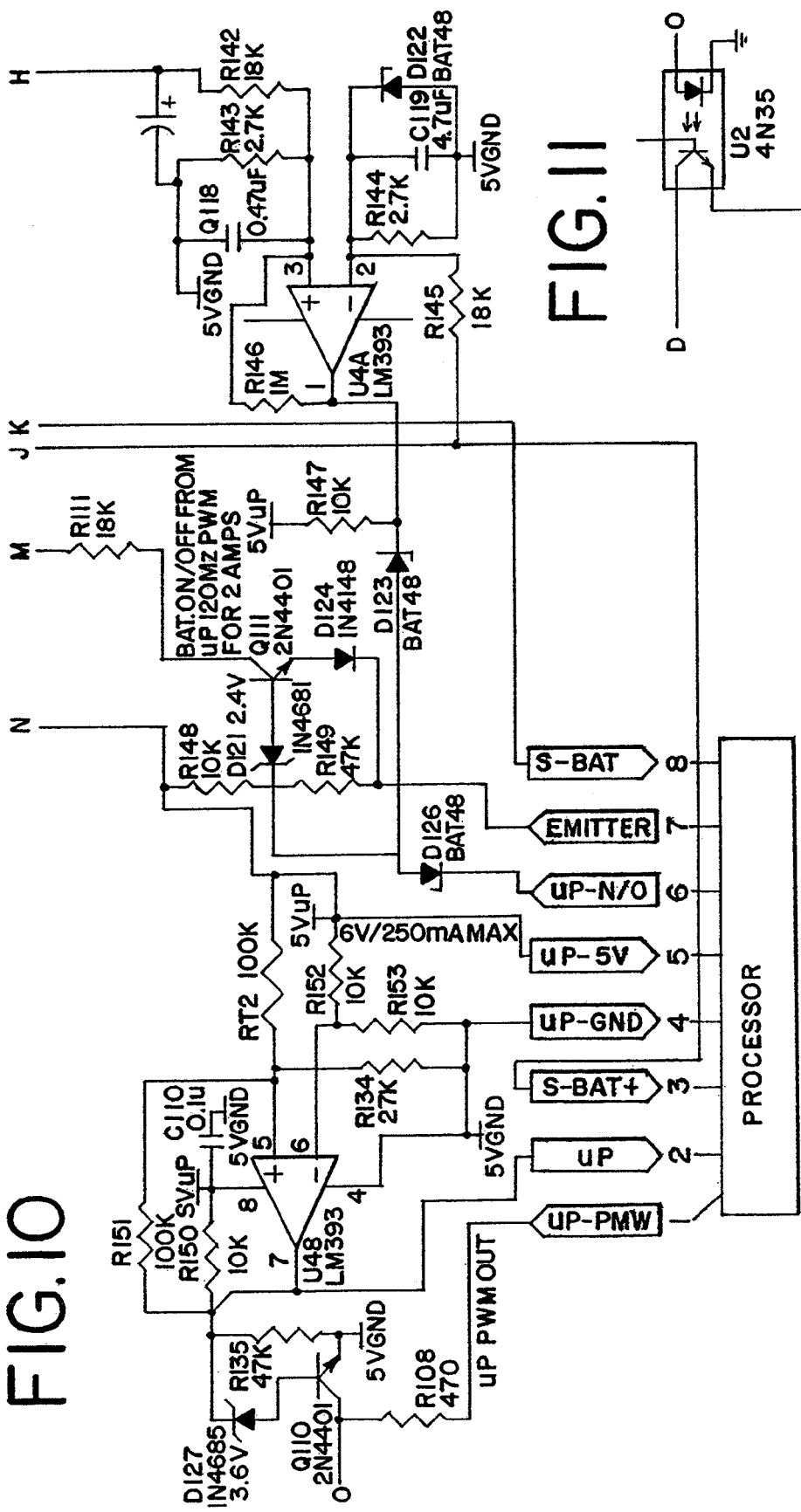
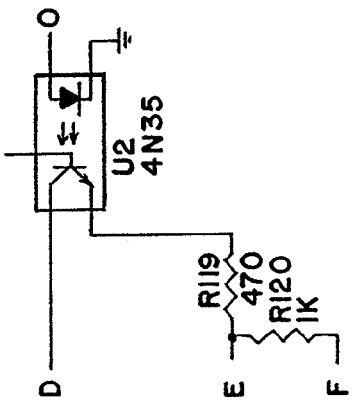
FIG. 10
FIG. 11

SYSTEM AND METHOD FOR CHARGING BATTERIES

CROSS-REFERENCE TO RELATED APPLICATIONS

This application is a divisional application of U.S. patent application Ser. No. 10/925,073, filed on Aug. 24, 2004 now U.S. Pat. No. 7,528,579, which, in turn claims the benefit of and priority to U.S. Provisional Application No. 60/514,407, filed Oct. 23, 2003, the disclosure of which is hereby incorporated by reference.

FIELD OF THE INVENTION

This invention relates to a system and a method that charges a battery, and more particularly, to a system and method that charges and monitors a rechargeable battery.

BACKGROUND

A battery can deliver current to a load such as an engine, a light, or a radio for a considerable length of time. As long as the potential difference between its terminals remains close to a nominal value and a sufficient current is generated, current will flow to the load. As the current flows, the battery's capacity to drive the load becomes diminished and may eventually become exhausted.

To replenish this loss, a battery may be connected to a source that provides both positive and negative charges to its electrodes. It is these charges that establish the potential difference and the current needed to drive the load. The charges are transported from one terminal to the other in a direction that is opposite to the bias of the terminals. One device that accomplishes this transport is an automobile battery charger.

A known automobile battery charger converts 120-volts, 60-Hz AC-line, to a 12-volt DC output through a power transformer, a bridge rectifier, and a filter. The power transformer consists of two separate windings that are magnetically coupled to each other. The first winding is connected to the 120-volt AC-line, and the second winding is connected to the bridge rectifier. Through a selection of an appropriate turn ratio, the AC-line voltage is stepped down to a 12-volts AC-line output. The bridge rectifier converts this stepped down AC-line output to a rectified output that is not always suitable for charging batteries. By eliminating the time varying magnitudes of the rectified output through a filter, the output of the battery charger is stabilized and is suitable for charging a battery.

Conceptually, the described battery charger is relatively simple and can be made inexpensively. The large size of the power transformer needed in many battery chargers can make the battery chargers very heavy. Other battery chargers may not provide a reliable charge or a reliable charge termination. Overcharging a battery can reduce a battery's life and lead to the emission of dangerous corrosives. If battery terminals are insulated by sulfates, some battery chargers will not deliver sufficient current to charge the battery. In this condition, the battery becomes an open circuit.

SUMMARY

The present invention is defined by the following claims. This description summarizes some aspects of the present embodiments and should not be used to limit the claims.

A high frequency battery charger comprises a converter, drive logic, and control logic. The converter transforms a DC voltage into a high frequency AC voltage. The drive logic controls a conversion of the high frequency AC voltage by producing a train of pulses. The control logic adjusts the output of the converter to maximize a charging cycle of a battery.

A method of transforming an AC input into a direct current output used to charge a rechargeable battery comprises transforming an AC-line input into a first DC output; transforming the first DC output into a high frequency AC output; transforming the high frequency AC output into a second DC output; and passing a charging current to a load when the load is correctly connected to an output of a charging connector.

Further aspects and advantages of the invention are described below in conjunction with the present embodiments.

BRIEF DESCRIPTION OF THE DRAWINGS

FIG. 10 is a second partial schematic of an exemplary second sensor and a delay of FIG. 3 coupled to a processor.

FIG. 11 is schematic of an exemplary isolator of FIG. 3.

DETAILED DESCRIPTION OF THE PRESENT EMBODIMENTS

The present system and method provide a highly efficient charging technology that maintains the charging levels of a battery within a desired range. The system and method may provide high frequency multi-stage charging to ensure that a battery reaches and sustains its full charge level. Depending on the battery type or a user's selection, a charging cycle of the system and method may be automatically terminated based on a monitoring of a battery voltage, a voltage change versus time, a temperature change versus time, a temperature change, a threshold current draw at a full charging voltage, a charge time, or any other metric or combination of metrics.

In some systems and methods, a sensor prevents the charging technology from over charging a battery or passing a charging current when a battery's terminals are hooked up in a reverse polarity or are shorted together. The charging technology may provide spark resistance even when the battery terminals are hooked up incorrectly. In some systems and methods, the charging technology provides a pulse charge that may break up contaminants, chemicals, or sulfate layers that may build up on a battery's electrodes.

Figure 1:
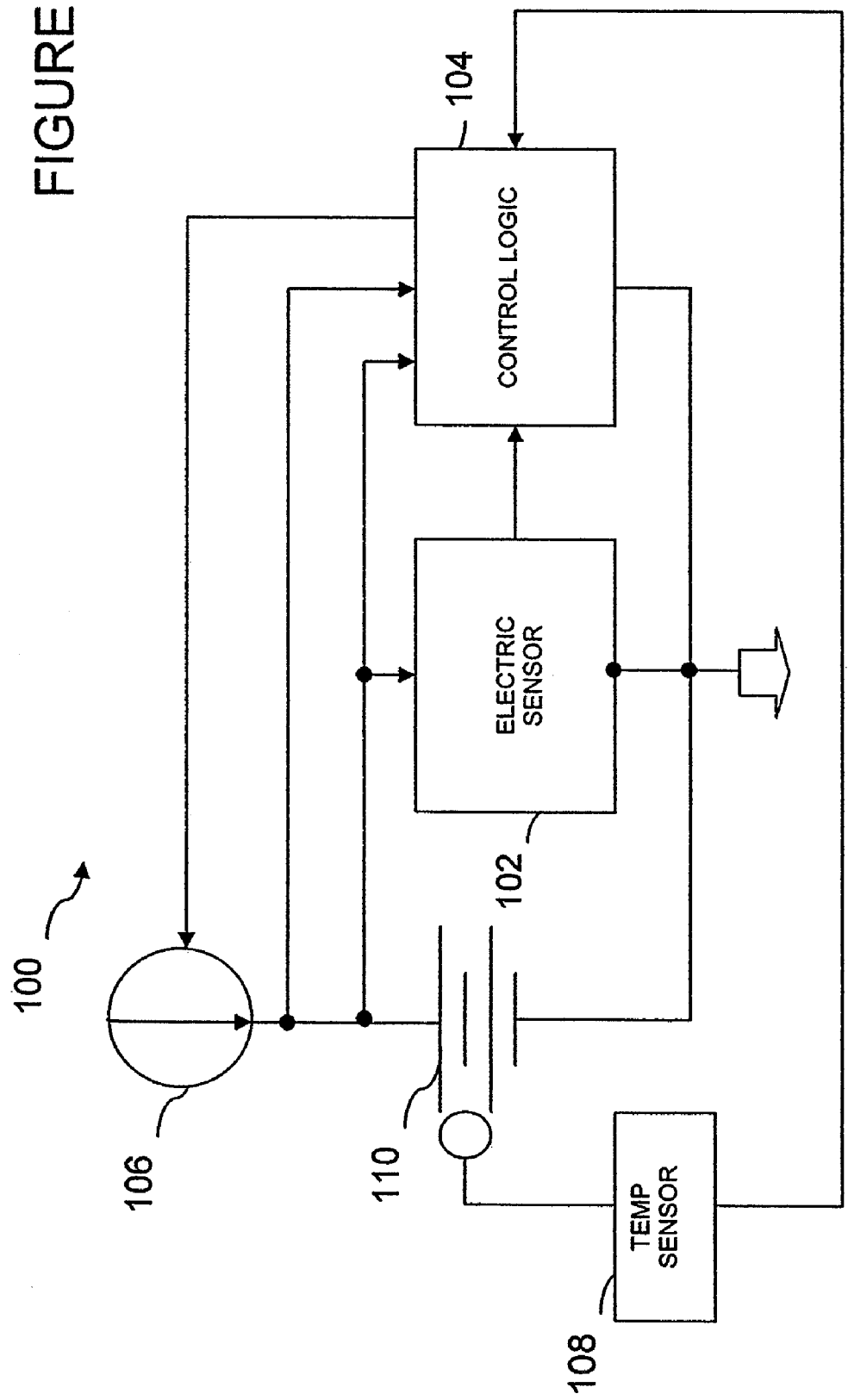
FIG. 1 is a block diagram of an exemplary high frequency battery charger coupled to a battery.

FIG. 1 illustrates an exemplary high frequency battery charger 100. In this illustration, a battery voltage is continuously or periodically monitored and a charging current continuously or periodically sensed by an electric sensor 102. A current source 106 sources a charging current that charges and replenishes the battery 110 under the control of control logic 104. A temperature sensor 108 monitors battery 110 temperature and/or circuit temperatures.

In the exemplary high frequency battery charger 100, a charging voltage or current may be adjusted to maximize a battery's 110 charge level. The exemplary high frequency battery charger 100 may provide a bulk charge in which a maximum safe amperage is sourced to the battery 110. In a bulk mode, the exemplary high frequency battery charger 100 may increase its charging voltage until the battery voltage reaches a predetermined or nearly a fully charged level. When the battery voltage reaches a desired level, the current source 106 may source an absorption or acceptance charge that maintains a relatively high fixed voltage until the charging current tapers off to a predetermined threshold. A float or trickle charge reduces the constant current applied to the battery 110 to provide maintenance without boiling off electrolyte. An equalization charge provides a continuous high voltage or a series of fast rising pulse charges that may equalize the balance between battery cells. An equalization charge may reverse the build up of some contaminants such as sulfides that may build up on a battery's electrodes.

Because one of the most difficult parts of the charging process may be to correctly determine the termination of a charge, the exemplary high frequency battery charger 100 may use one or more systems or methods to terminate a charging cycle or sustain an equalization charge. Depending on an automatic or manual selection, the battery charge may automatically terminate a charging cycle based on the monitoring of a battery voltage, a voltage change versus time, a temperature change versus time, a temperature change, a threshold current draw at a predetermined or full charging voltage, a charge time, or any other metric or combination of metrics. For example, a termination may occur when a battery reaches a desired threshold voltage or an absolute temperature, when the battery voltage reaches a peak or falls within a voltage range after reaching that peak, when a battery's temperature changes with respect to time exceeds a programmable threshold or when time lapses. In addition, a secondary termination process may also be used to back-up the primary termination process. The secondary termination may comprise any metric or combination of metrics including those described above.

Figure 2:
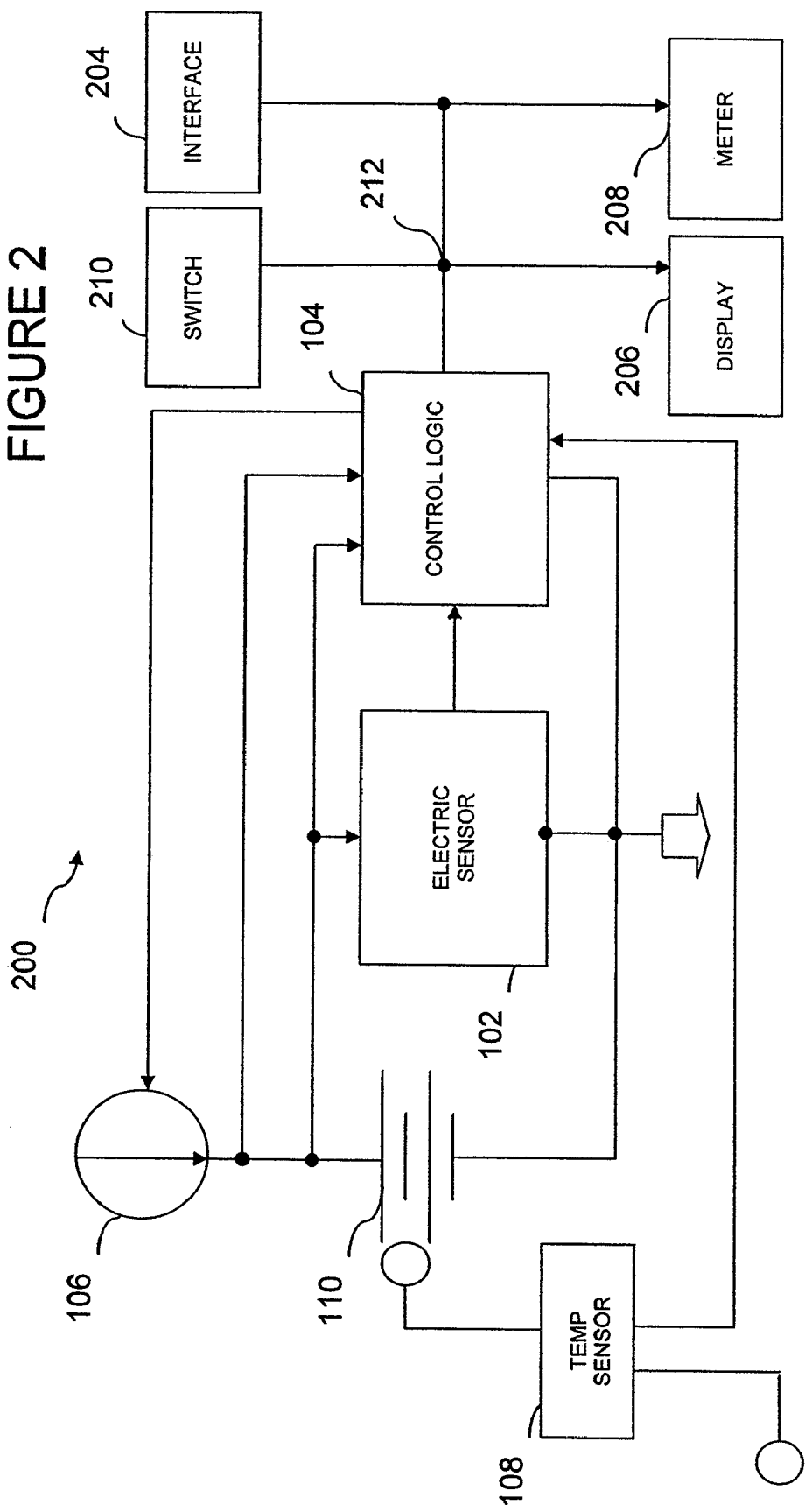
FIG. 2 is a block diagram of a second exemplary high frequency battery charger coupled to a battery.

FIG. 2 illustrates a second exemplary high frequency battery charger 200. The second exemplary high frequency battery charger 200 provides a programmable current control 106, one or more switches 210, an interface 204, a display 206, and a meter 208. The switches 210 may be used to activate the exemplary high frequency battery charger 200 or select a charge mode, such as a bulk charge, an absorption charge, a float charge, an equalization charge, or a start charge that is capable of delivering a sufficient charging current to start a vehicle. When coupled to a communication application, the switches 210 may include an electronic or electromechanical device that controls the routing of signals through a parallel or a serial bus 212. In this exemplary high frequency battery charger 200, the bus 212 allows for the transfer of data between devices. One or more switches 210 may also control diagnostics, a selection of a display mode, a selection of predetermined charging currents (e.g., a two amp, ten amp, or another amperage) and/or a selection of a battery type.

A computer readable medium such as software may provide access to the controller 104 and its memory allowing a user or a device to receive or transfer information from a remote location. The interface 204 may allow a user or a remote or local device to request a service, initiate a diagnostic, program a charging interval or cycle, receive information relating to the battery or to the charging process, or process a request to display results. The meter 208 shown interconnected to the bus 212 preferably indicates and/or stores a characteristic of the battery or the charging process in a memory coupled to or resident to the controller 104. The controller 104 may record the current flowing through the battery 110 overtime, the charging voltage, the battery's 110 temperature, the ambient temperature, or any other recordable characteristic. This information may be exchanged or shared with any device that may interface the bus 212, including a vehicle interface or a communication link or a printer.

Because the programmable current control 106, electric sensor 102, and control logic 104 (e.g., the control circuits) of FIG. 2 are stable and predictable in time and temperature, the temperature sensor 108 shown in FIG. 2 may measure the temperature of the battery 110, an ambient temperature, and/or a temperature of the control circuits. Temperature parameters may be used to adjust the operation of the exemplary high frequency battery charger 200, including a selection of a charging current or a voltage level to maintain circuit stability and/or maximize a battery's 110 charge level.

Figure 3:
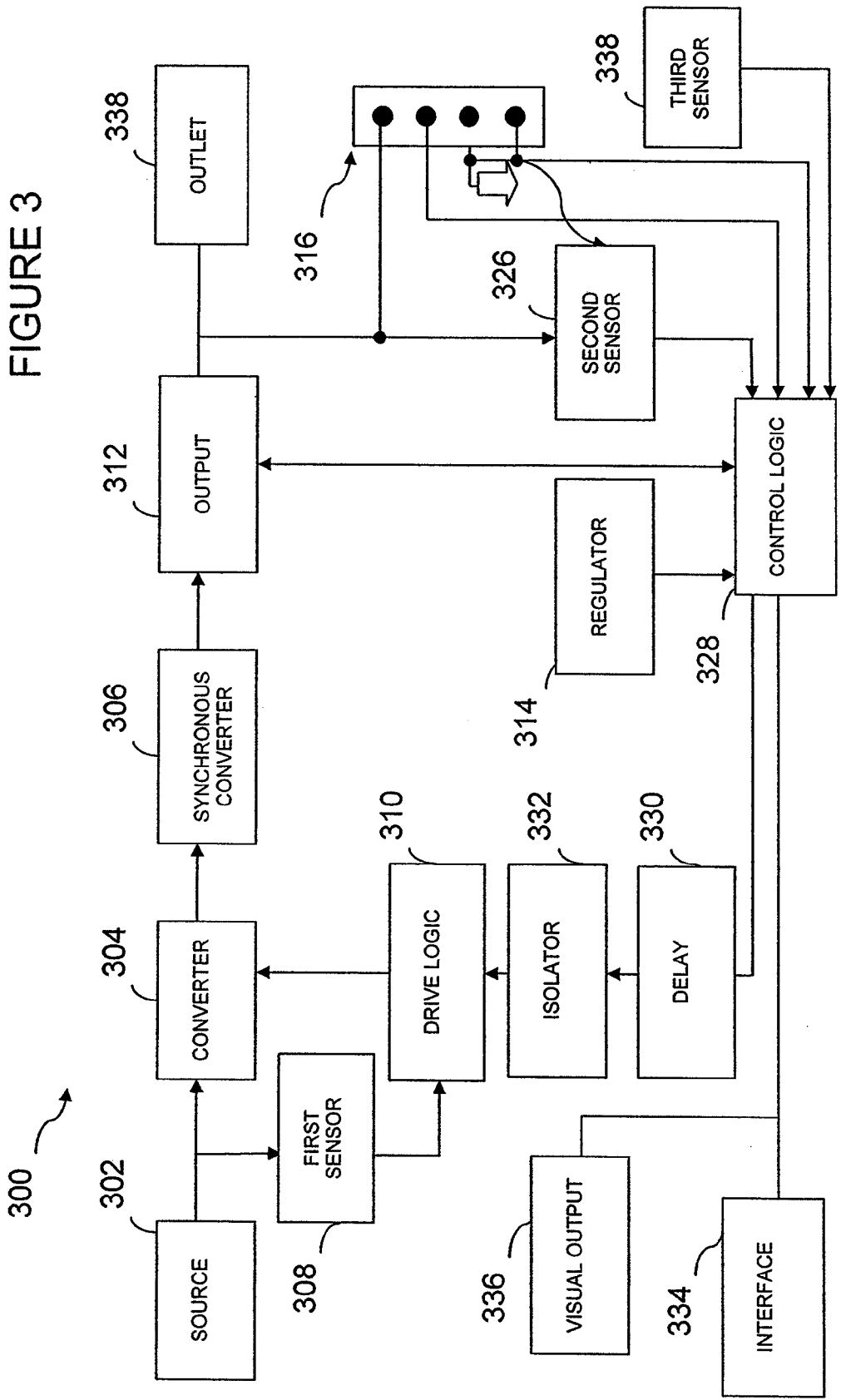
FIG. 3 is a block diagram of a third exemplary high frequency battery charger.

FIG. 3 illustrates a third exemplary high frequency battery charger 300. The third exemplary high frequency battery charger 300 converts electric power from an alternating current (AC) source 302 to a direct current (DC). A converter 304 transforms a uniform periodic input that varies in time into a block-like waveform that changes in time between a positive going state and a negative going state. Drive logic 310 controls the state of the block-like waveform. A high output from the drive logic 310 generates a positive going pulse; a pulse that is then stepped down by a transformer that links the output of the converter 304 to the synchronous converter 306.

A first current sensor 308 interconnected to the source 302 and the drive logic 310 senses high current conditions. When a high threshold current level is exceeded, the drive logic shuts down and the charging stops.

During normal operation, a transformer steps down the high frequency block-like waveform to a predefined amplitude. Using a pair of switches, the synchronous converter 306 transforms the block-like waveform into a desired DC voltage and charging current level.

A second sensor 326 senses the desired DC voltage or current flow at the output 312. A measurement of the voltage or current at the output connector 316 allows the control logic 328 to monitor and control the charging process and ensure that the battery is not under or over charged.

If a defective battery is connected to the output connector 316, the control logic may 328 detect the defective battery by monitoring the output at the battery connector 316 through the second sensor 326. If a defective battery is detected, some exemplary high frequency battery chargers disable output current flow to minimize the risk of injury. Other exemplary high frequency battery chargers select a modified float or trickle charge that passes only a safe charging current for a predetermined period of time. If a low battery voltage persists, the battery is/maybe considered defective, and the charge cycle is/may be terminated. In some exemplary high frequency battery chargers, the control logic 328 may issue an audio or visual warning when a defective battery is detected.

A spark resistant protection from a reverse hook-up or shorted output is provided through a third sensor 338. When battery-charging terminals are hooked-up in a reverse polarity or are shorted together, the third sensor 328 senses the condition and notifies the control logic 328. Once notified, the control logic 328 may shutoff the output 312, which resists or prevents sparking.

The exemplary high frequency battery charger 300 may not pass a charging current until the output of a regulator 314 exceeds a voltage threshold and the control logic 328 senses a correct polarity and a threshold battery voltage. When these conditions are met, a soft start delay may be initiated through the delay logic 330. Once the delay lapses, a signal from the isolator 332 may initiate the charging process by waking up the drive logic 310.

An interface 334 provides a point of connection between the control logic and any other entity, any other device such as a remote or local computer or a remote or local terminal or a vehicle control module or computer, or a remote user. A visual output 336 provides data or information in a visual form. An outlet 338 provides an ancillary source of power to one or more external loads.

Figure 4:
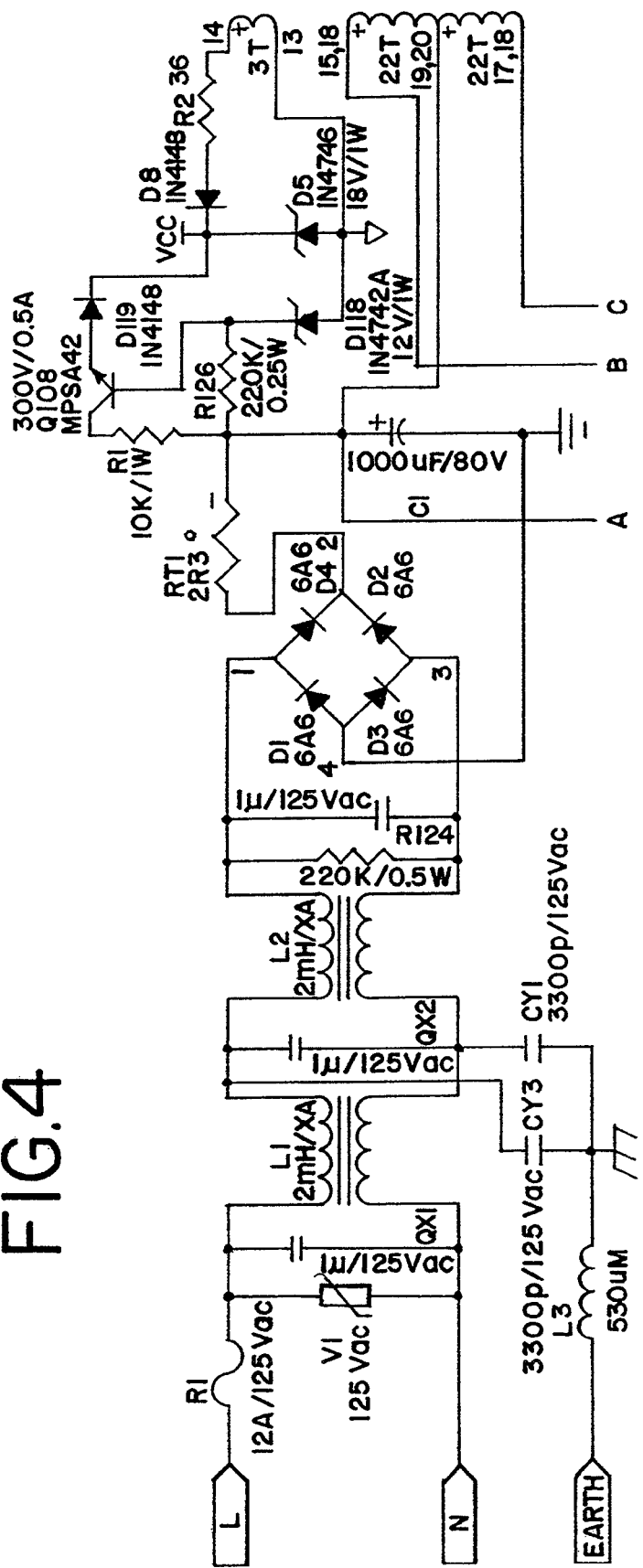
FIG. 4 is a schematic of an exemplary converter of FIG. 3.

FIG. 4 illustrates an exemplary converter. The exemplary converter 404 uses a two-stage power conversion topology to scales the 120 V (rms) 60-Hz AC-line into a higher voltage square wave. The AC-line is fed through a fuse, transient suppressor, and LC line filters. The transient suppressor reduces voltage spikes. The LC line filters dampen interference.

A full wave diode rectifier converts the input AC-line voltage into a rectified output. Variations in the rectified output are reduced by a capacitor C1. The DC voltage across capacitor C1 is transformed into a high frequency square wave. The high frequency square wave is generated and scaled by the drive logic 410 that completes current paths to selected primary windings of a first transformer T1.

Figure 5:
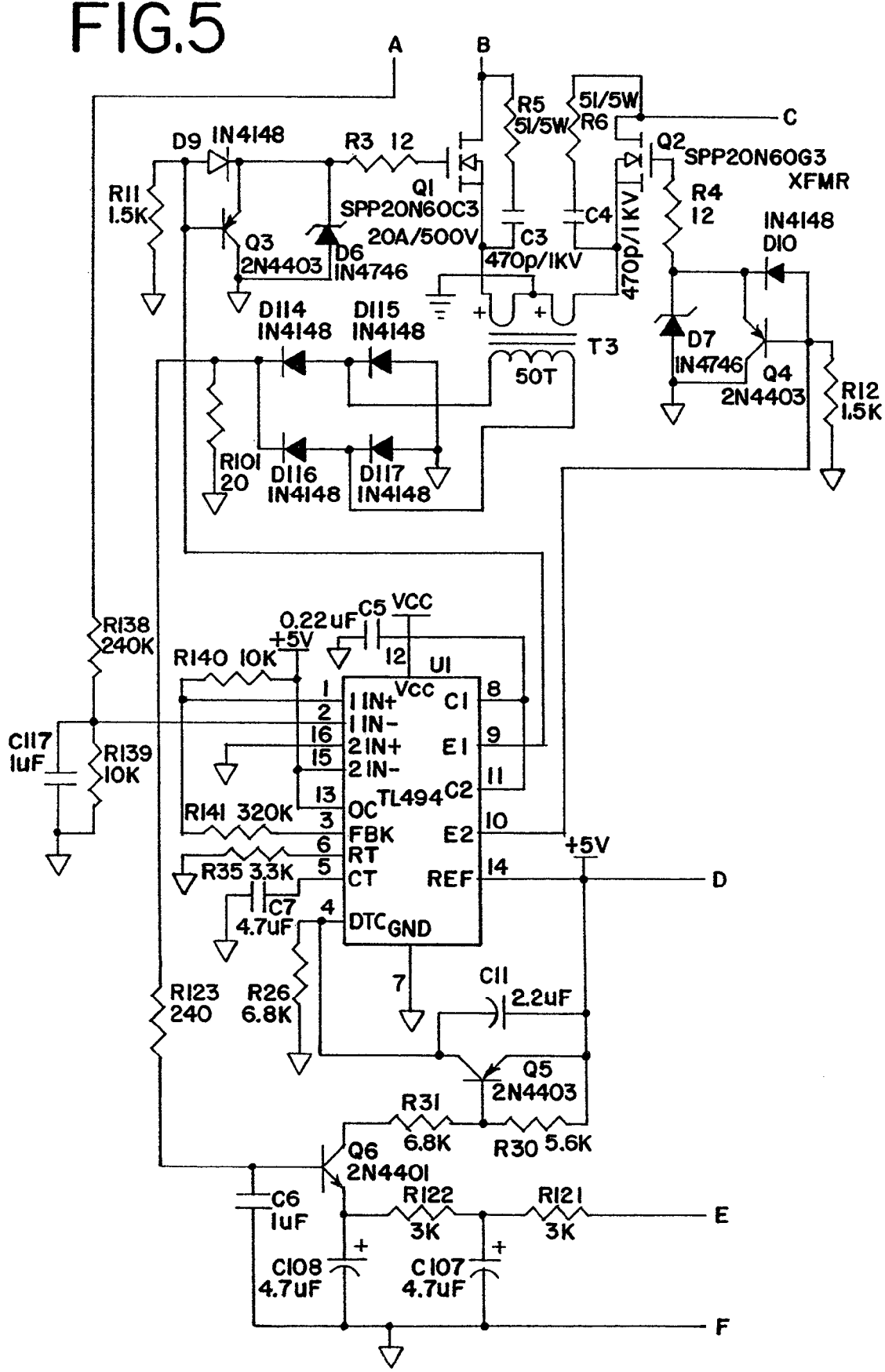
FIG. 5 is a schematic of an exemplary first sensor and drive logic of FIG. 3.

As shown in FIG. 5, a pair of switches Q1 and Q2 connected to nodes B and C, respectively, provides current paths under the control of a pulse width modulator U1. The pulse width modulator varies the duration of a train of pulses that control switches Q1 and Q2.

Figure 6:
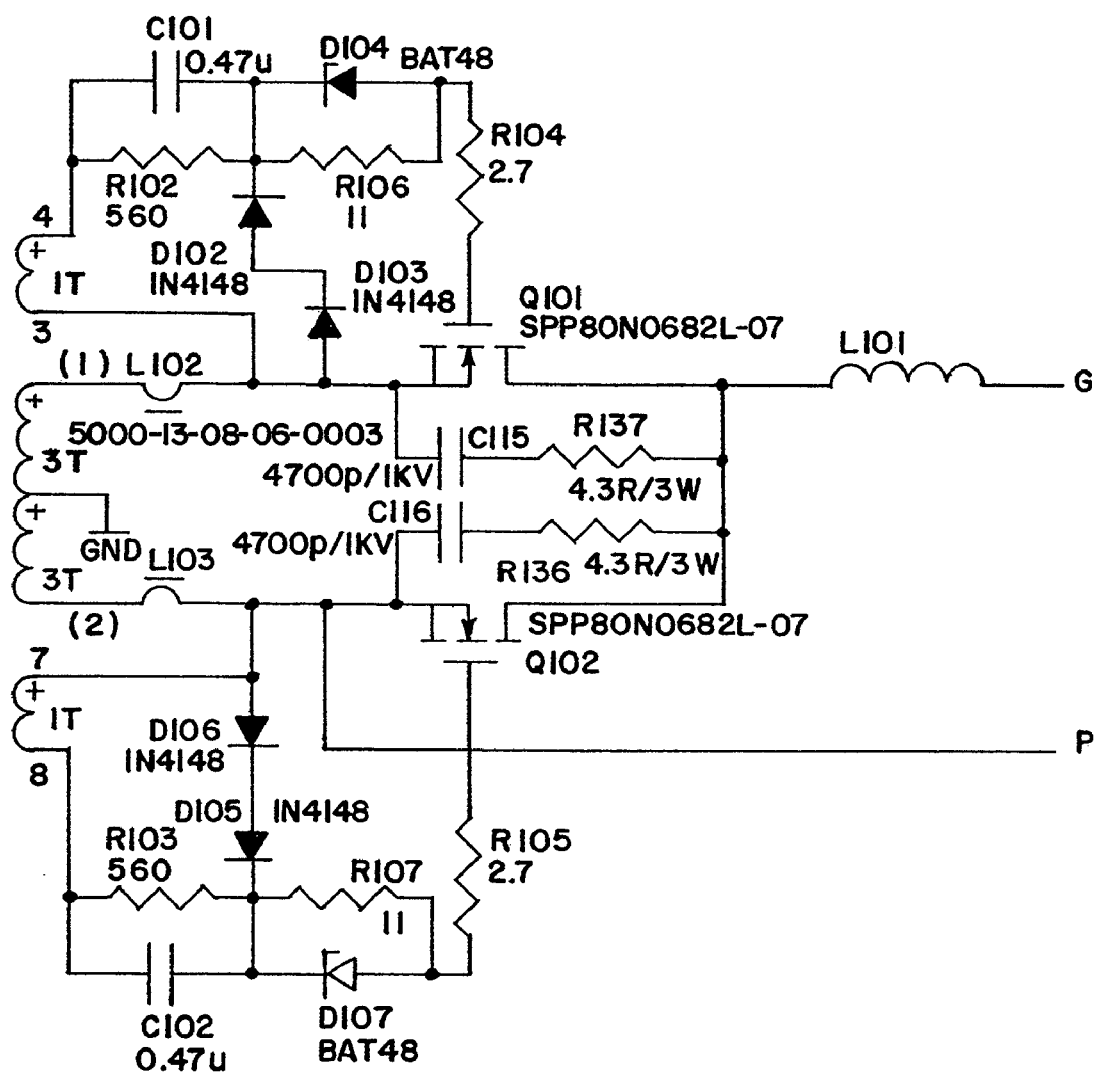
FIG. 6 is a schematic of an exemplary synchronous converter of FIG. 3.

As shown in FIGS. 5 and 6, a high current sensor comprised of a second transformer T2, a pair of switches Q5 and Q6, and the pulse width modulator U1 shuts off switches Q1 and Q2 when a high current condition is sensed. Through a selection of an appropriate turn ratio (N1/N2), the rectified voltage is electrically isolated from the pulse width modulator U1 and stepped down to bias switch Q6. When a sufficient bias is reached, switches Q5 and Q6 are turned on pulling a dead time control (DTC) input of the pulse width modulator U1 high. This shuts down the output of the exemplary high frequency battery charger 300.

During a normal charging operation, the first transformer T1 steps down the high frequency square wave to a selected amplitude. The first transformer T1 bridging FIGS. 4 and 6 provide electrical isolation between the high voltage circuits shown in FIGS. 4 and 5 and the low voltage circuits shown in FIGS. 5-12.

A pair of switches Q101 and Q102 shown in FIG. 6 transforms the stepped down square wave into a desired charging current and DC voltage level. A line filter L101 connected to node G dampens line interference. A tap, node P, supplies power to a five-volt regulator U3 (FIG. 8) that supplies power to digital circuitry and other external loads when needed.

Figure 7:
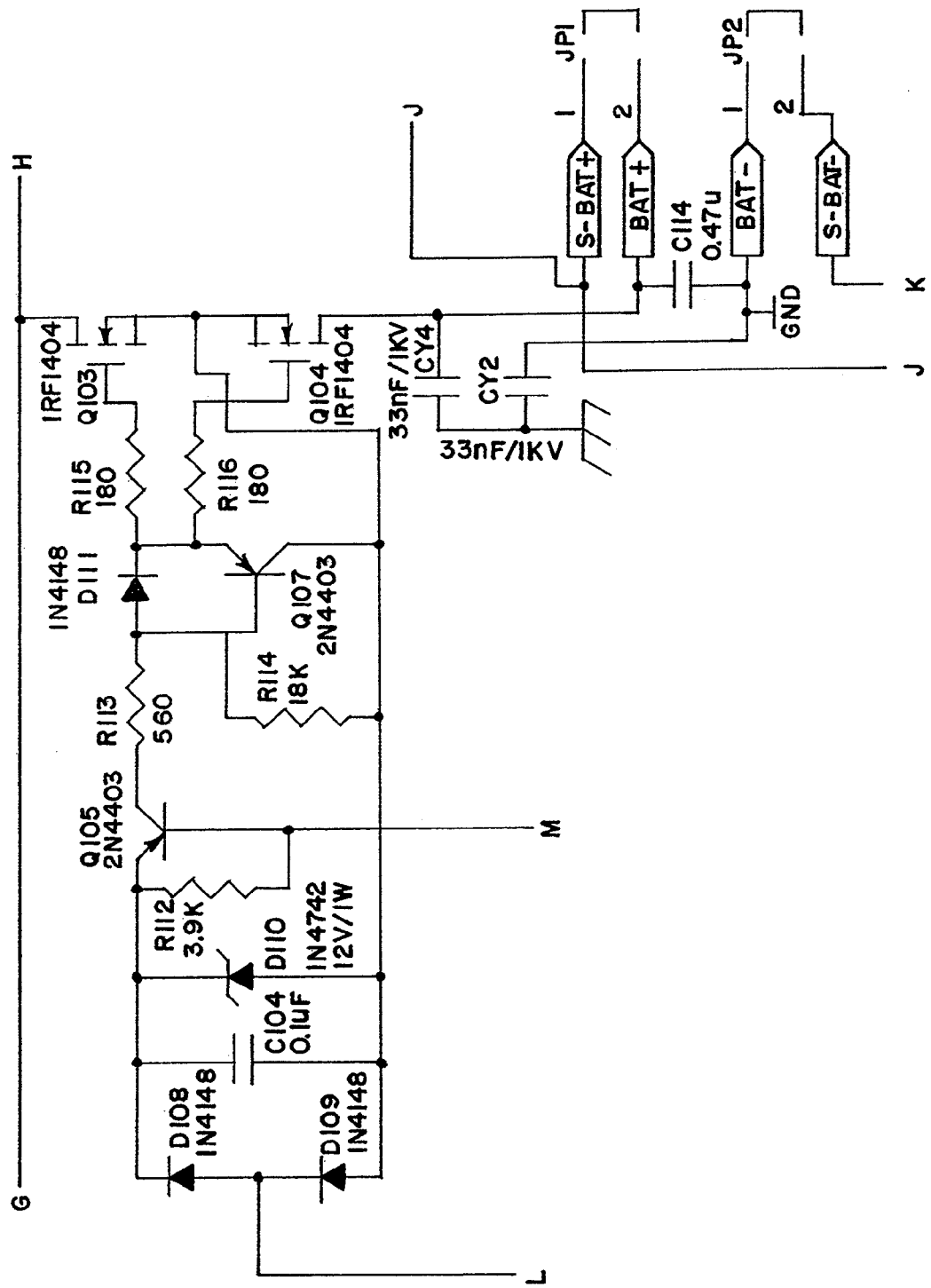
FIG. 7 is a schematic of an exemplary output of FIG. 3.
Figure 8:
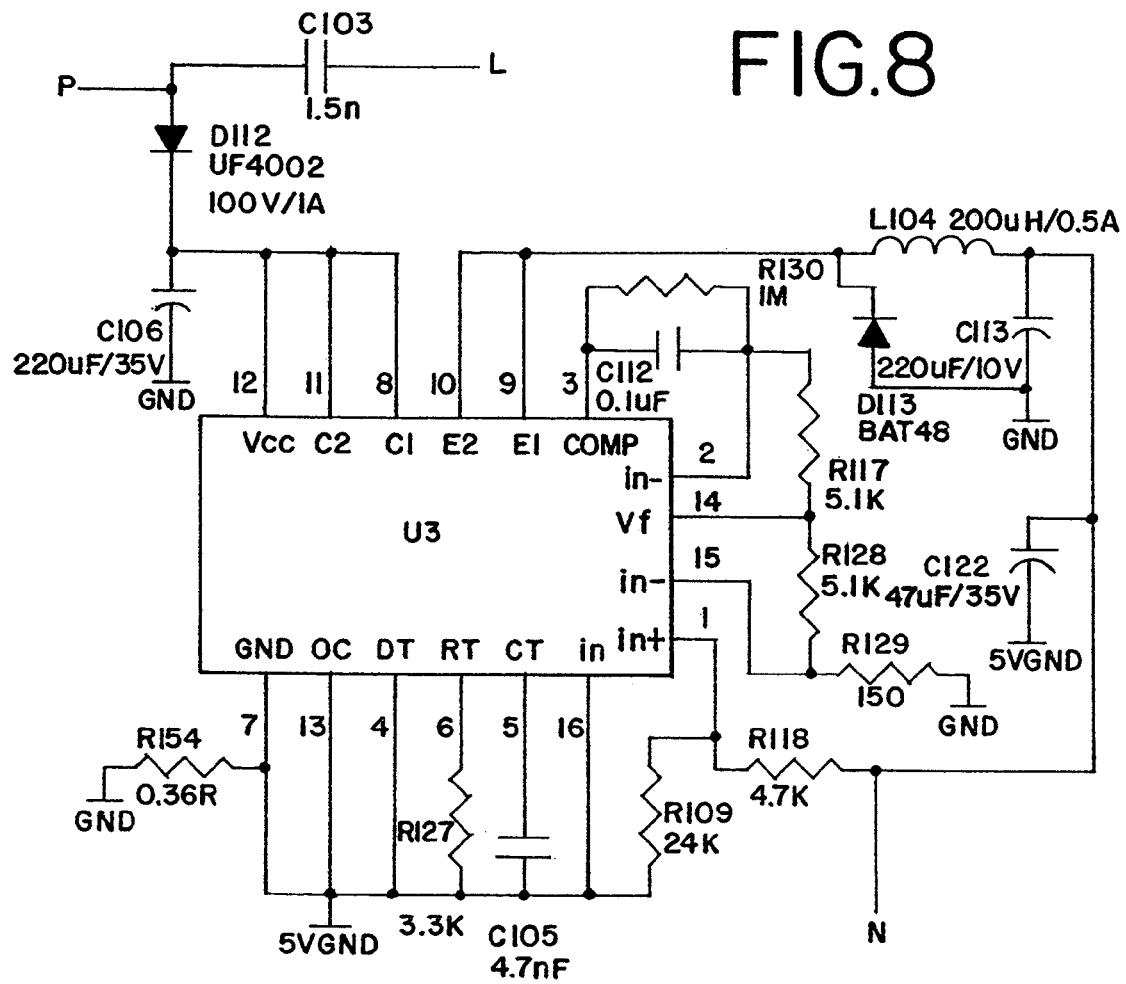
FIG. 8 is a schematic of an exemplary regulator of FIG. 3.

If a battery or load is correctly connected to the exemplary high frequency battery charger 300, charging current will flow through switches Q103 and Q104 shown in FIG. 7 to the battery or the load. A second sensor, that may be comprised of a processor, senses the output voltage of the battery or current flow into the battery at the battery terminals Bat+ and Bat−. The processor, which may include an on-chip analog-to-digital converter, monitors and controls the charging current and voltage to ensure that the battery is not under or over charged. In some exemplary battery chargers, the processor comprises a microprocessor or a signal processor, in other exemplary battery chargers, the processor comprises a device that controls high-speed data manipulations.

If a vehicle's alternator is charging a battery, the processor may disable current flow through switches Q103 and Q104 and monitor the charging voltage and/or current generated by the alternator. If a low current or a low voltage condition is detected, the processor may issue an audio or visual warning that may be stored in a memory. The memory may be coupled to the processor or coupled to a controller resident to a vehicle.

If a defective battery is connected to the exemplary high frequency battery charger 300, the processor may monitor the charging cycle at the battery connectors Bat+ and Bat−. Differential amplifier U4A shown in FIG. 10 compares a scaled charging voltage sourced through node H to a scaled battery voltage sourced through node J. If the scaled charging voltage exceeds the scaled battery voltage, a potentially defective battery may be detected. Some exemplary high frequency battery chargers disable output current flow when a defective battery is detected to minimize the risk of injuring a user. Other exemplary high frequency battery chargers select a modified float or trickle charge mode that passes only a safe charging current for a predetermined period of time. If a low voltage persists at the battery connector Bat+ and Bat−, the load may be considered defective, and the processor may terminate the charging cycle.

A termination signal may be generated when a low or a high voltage load is detected, cables are connected in a reverse polarity, upon completion of a charging cycle, upon a user's command, and under many other conditions. A charging cycle terminates when an active low termination signal is received at node M. The termination signal turns off switches Q105, Q107, Q103, and Q104, which disable the charging voltage and current.

Figure 9:
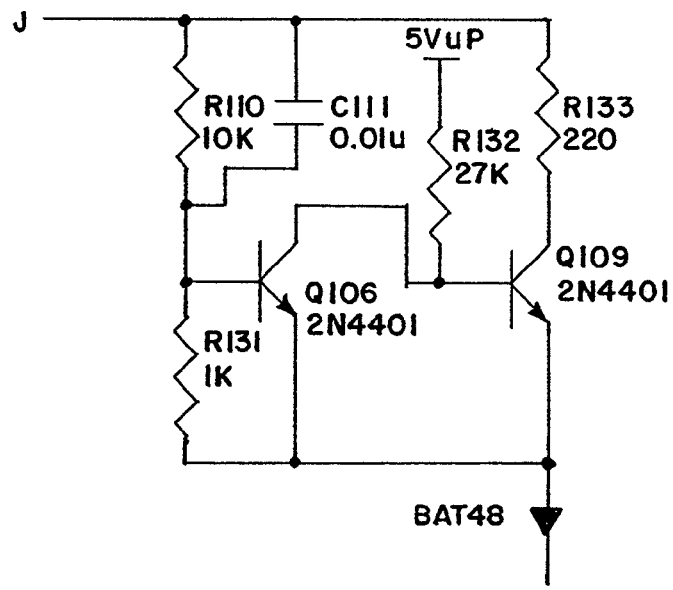
FIG. 9 is a partial schematic of an exemplary second sensor of FIG. 3.
Figure 12:
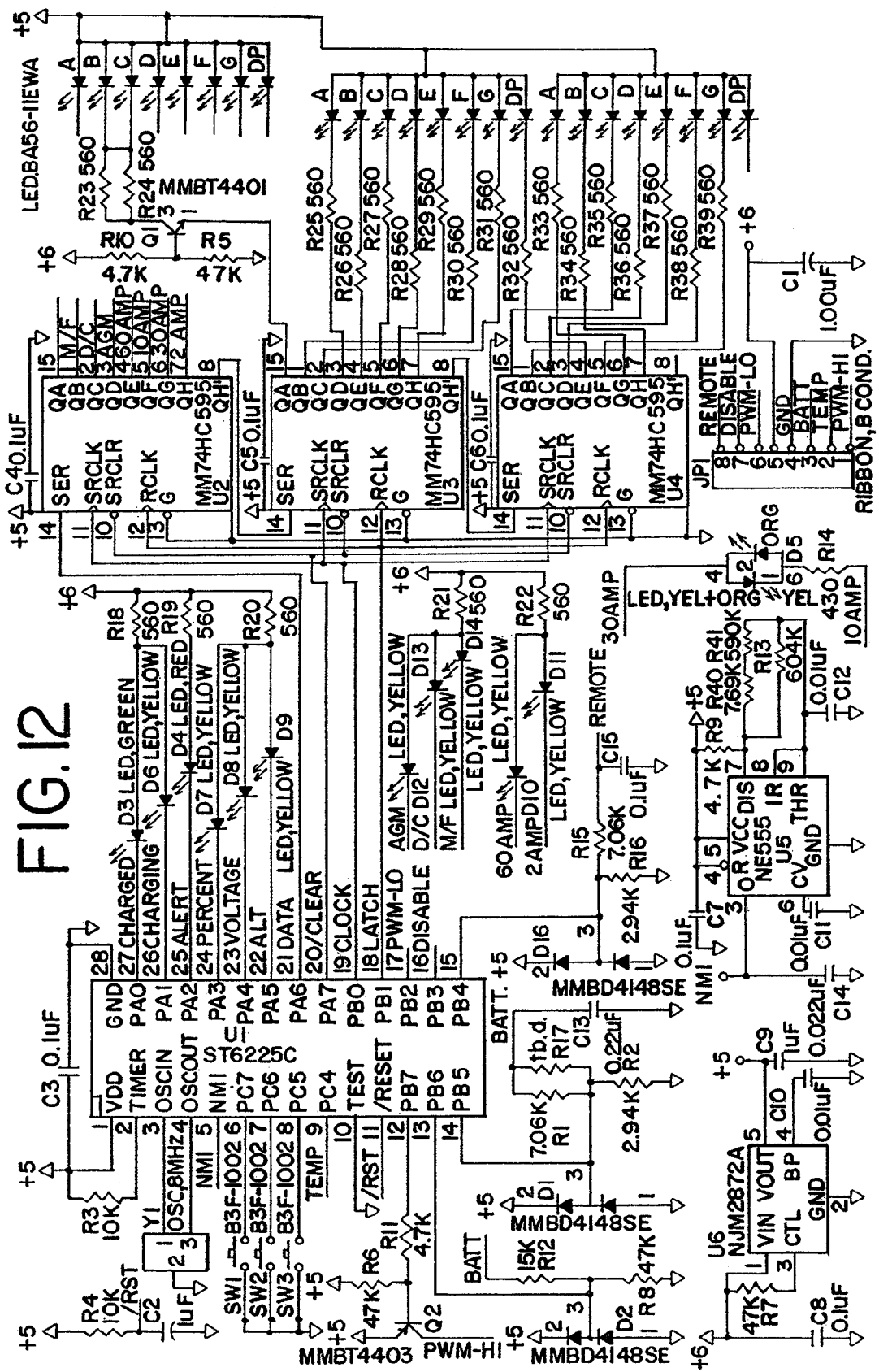
FIG. 12 is a schematic of an exemplary display driver and visual output of FIG. 3.
Figure 13:
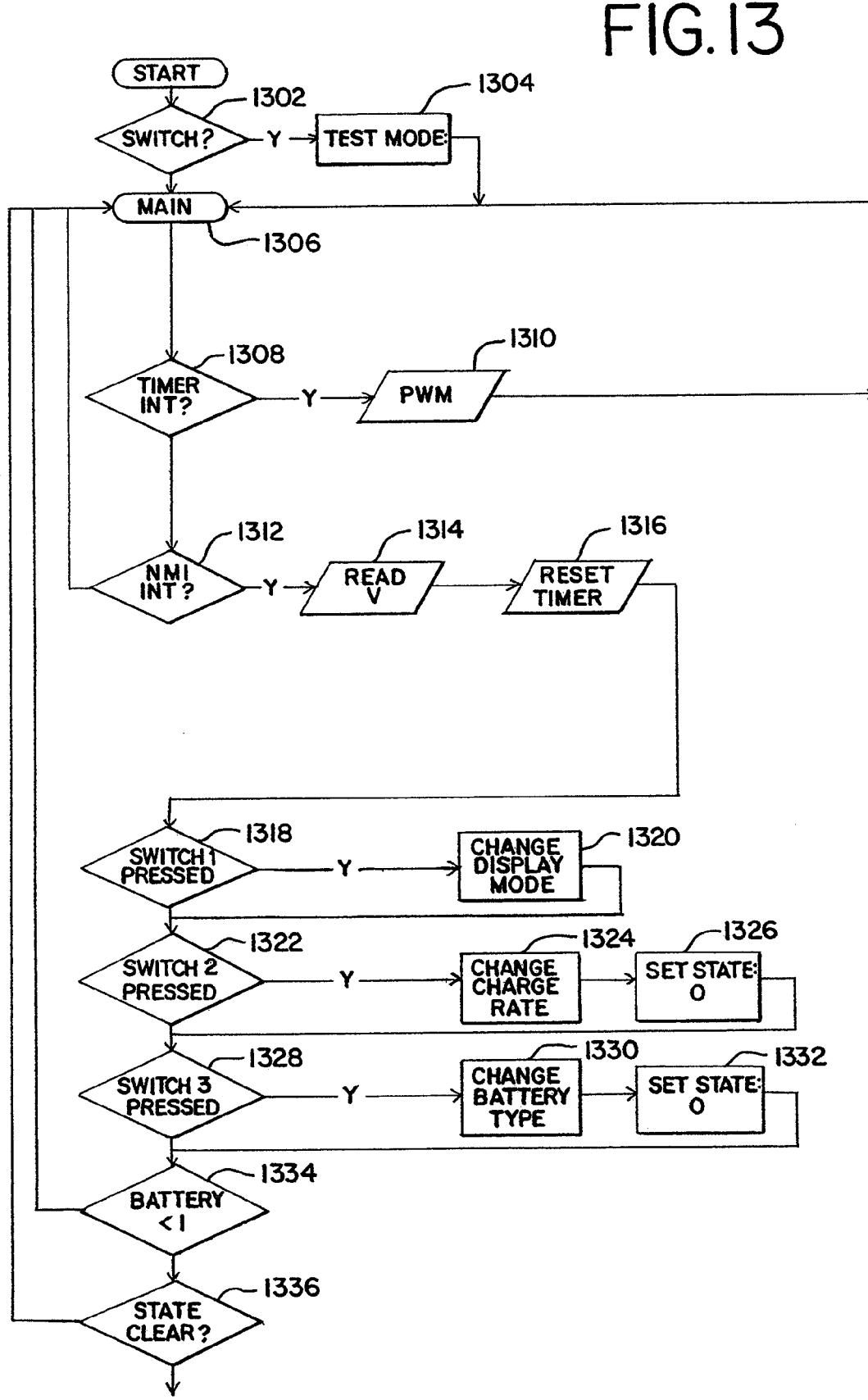
FIG. 13 is a partial exemplary flow diagram of the states of an exemplary high frequency battery charger.
Figure 14:
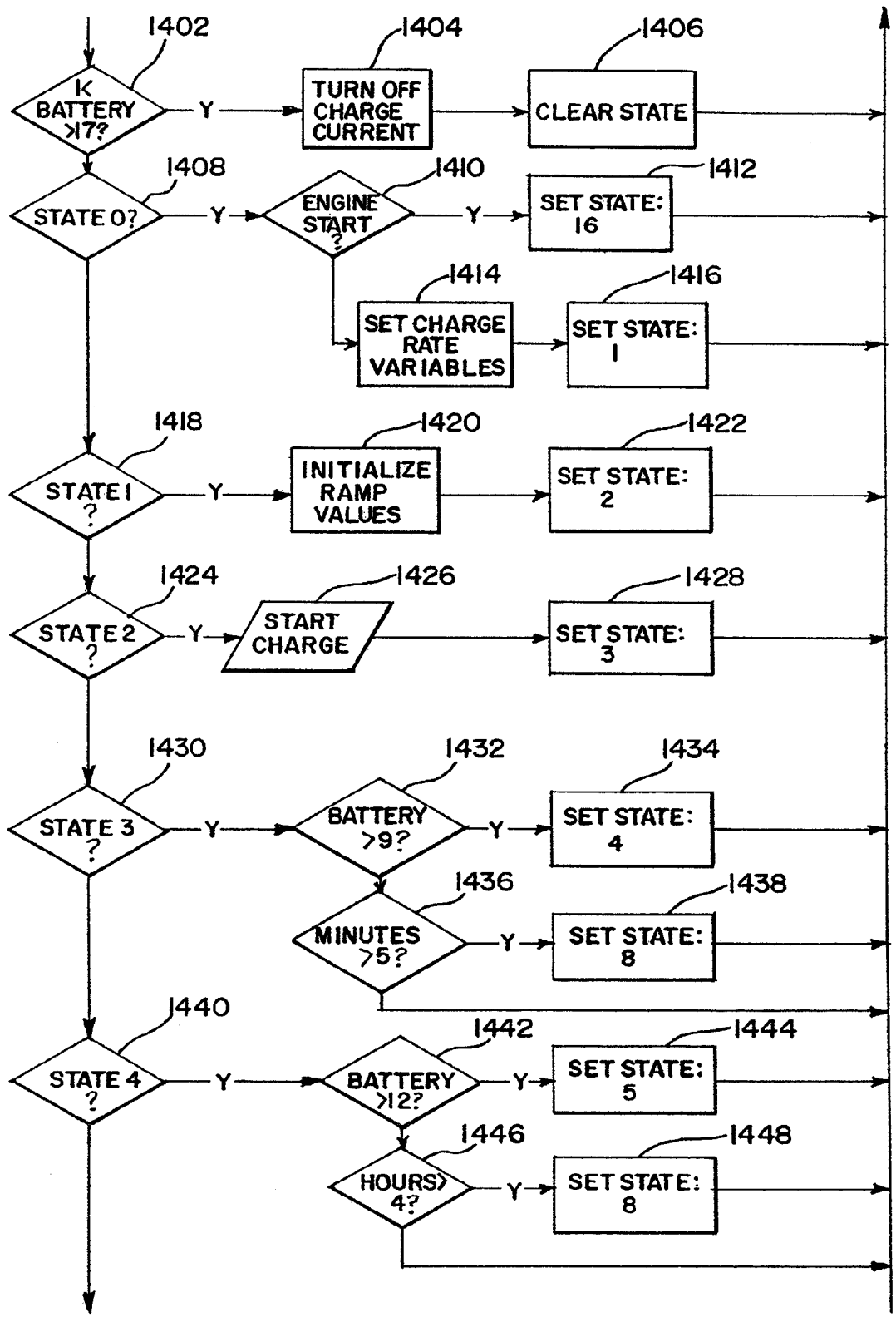
FIG. 14 is a partial exemplary flow diagram of the states of an exemplary high frequency battery charger.
Figure 15:
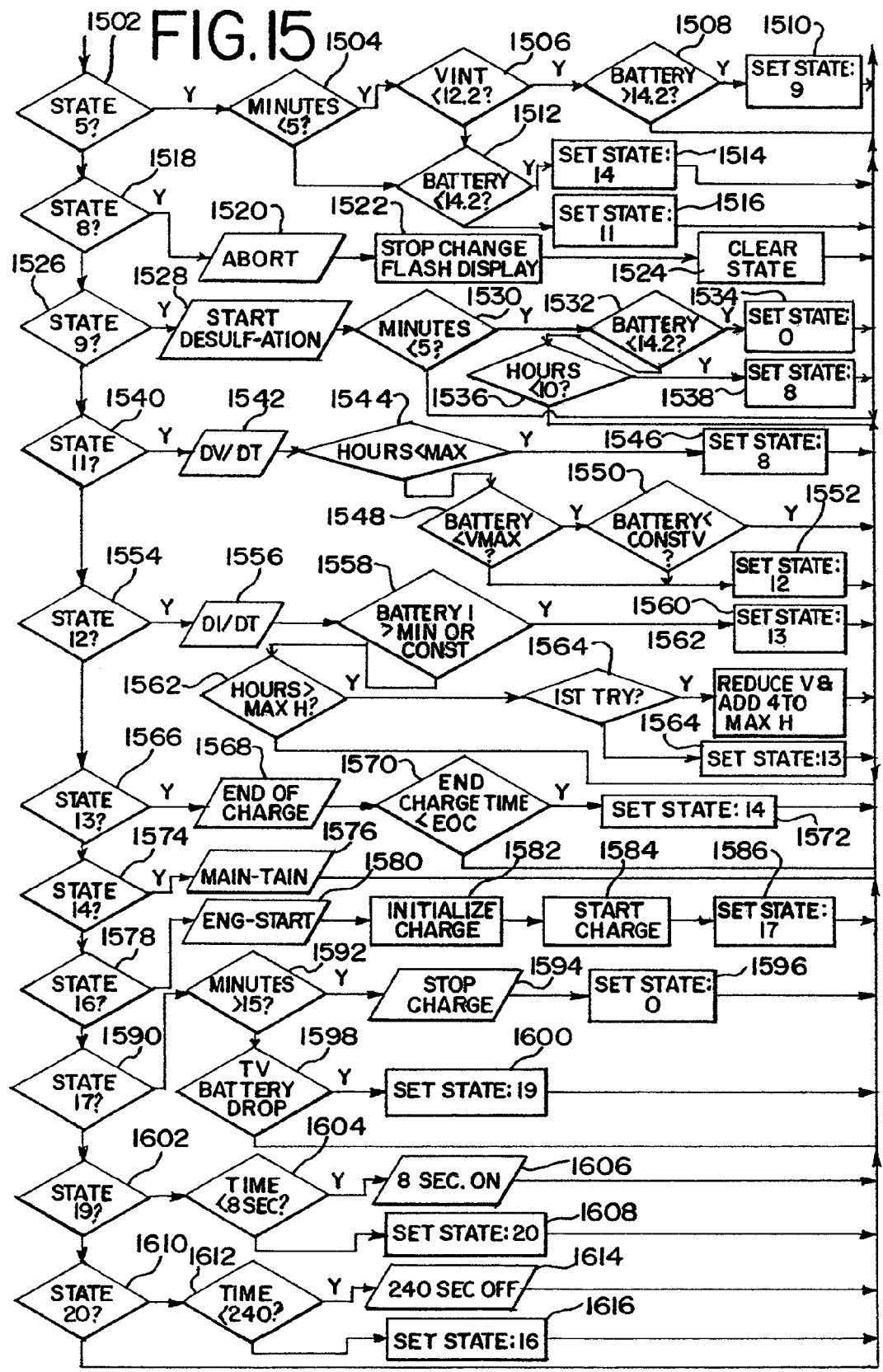
FIG. 15 is a partial exemplary flow diagram of the states of an exemplary high frequency battery charger.
Figure 16:
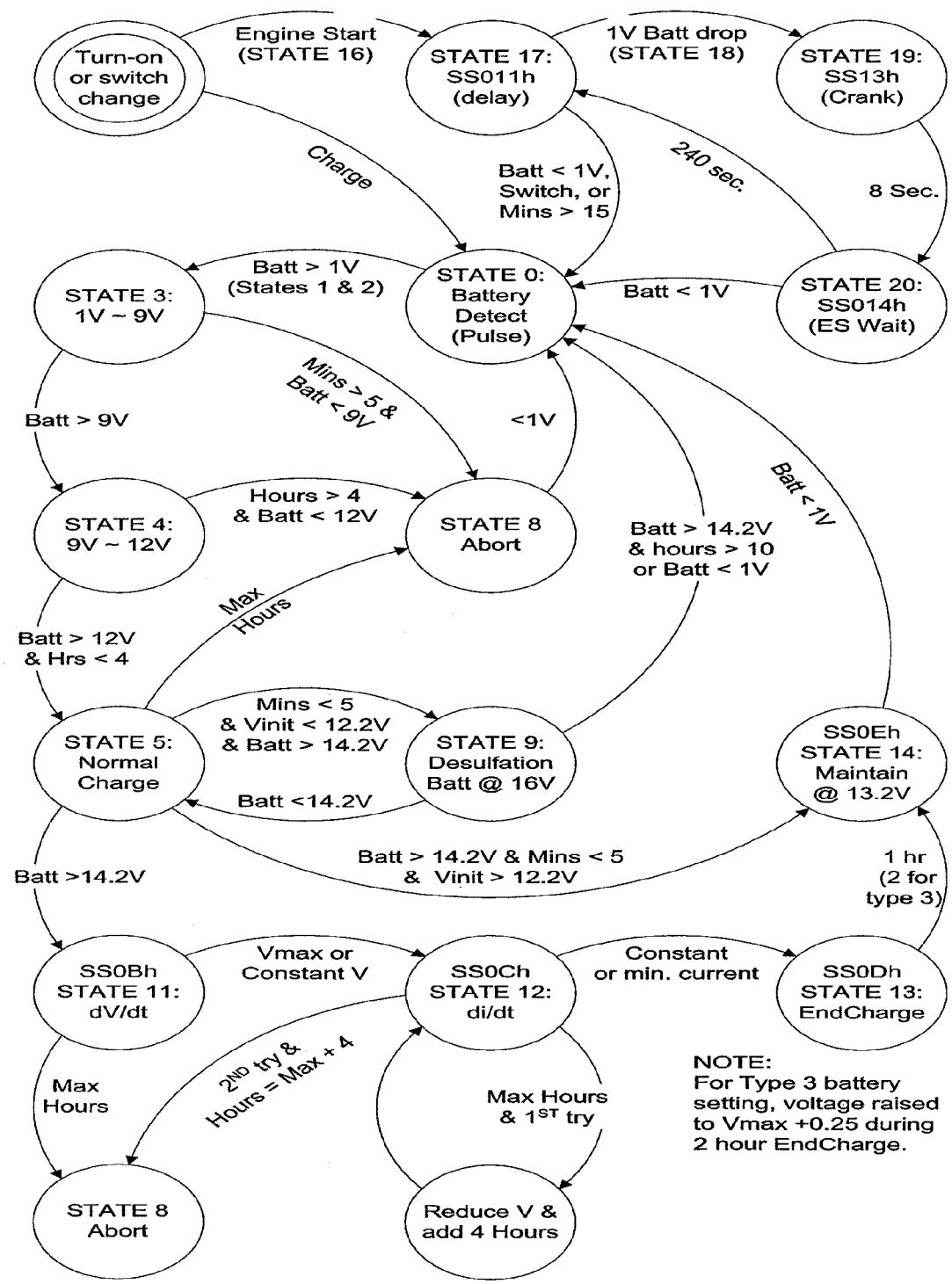
FIG. 16 is an exemplary state diagram of an exemplary high frequency battery charger.

A pair of switches Q106 and Q109 shown in FIG. 9 and the processor shown in FIG. 10 provides spark resistant protection from a reverse polarity connection. When the battery terminals are hooked-up in reverse polarity, a negative bias turns switch Q106 off and a positive bias turns switch Q109 on. The negative battery sense is pulled high by its direct connection to the negative battery terminal. When the negative battery sense is pulled high, a termination signal turns on switch Q105 and turns off switches Q103 and Q104 of FIG. 7 shutting down the exemplary high frequency battery charger 300. Similarly, a short circuit at the battery connector Bat+ and Bat− disables the charging current and prevents sparking.

The exemplary high frequency battery charger 300 may not pass a charging current until the output of a regulator 314 exceeds a low voltage threshold and the processor senses a correct polarity and a threshold battery voltage. When these conditions are met, a signal from an opto-isolator U2 shown in FIG. 11 initiates the charging process by providing a reference voltage to the pulse width modulator U1 shown in FIG. 5. The reference voltage may control and regulate the pulse width modulator U1, including the duration of the pulse width and frequency of the output that drive switches Q1 and Q2. A visual display illustrated by the drivers U1-U4 and light emitting diodes D1-D15 shown in FIG. 12 transform data or information from the exemplary battery charger into a visual format. The display may show images, graphics, icons, menus, and dialog boxes that can be selected by a user's touch or a relative or absolute pointing device at a local or remote location.

As shown in FIGS. 13-16, an exemplary battery charging method is illustrated through a sequence that may be translated into a computer readable or a storable medium such as a memory, programmed within a device such as one or more integrated circuits, or processed by a controller, a computer, a server, or a server cluster. If the method is performed by code or software, the code or software may reside in a memory resident to or interfaced to the control logic 328 of FIG. 3, a communication interface, or any other type of non-volatile or volatile memory interfaced or resident to the high frequency battery charger. The memory may include an ordered listing of executable instructions for implementing logical functions. A logical function may be implemented through digital circuitry, through source code, or through analog circuitry. The code or software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports code or software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber (optical). A machine-readable medium may also include a tangible medium upon which code or software is printed, as the code or software may be translated into a high-level language that may be compiled through a scanner, and/or interpreted or otherwise processed. The processed medium may then be stored in a computer and/or machine memory.

The computer readable medium may program a device to perform multi-stage charging, spark resistance, break-up contaminants or chemicals that build up on electrodes, perform diagnostics, and perform fault detection. Like the exemplary high frequency battery chargers described above, the present battery charging method may be used on a deep-cycle, lead-acid, calcium lead, and automotive or marine batteries including a gel electrolyte battery.

At act 1302 the exemplary battery charging method commences by detecting the state of a switch. In the exemplary battery charging method, a switch is a control device or an automated system used to control the execution of the exemplary battery charging method. In FIGS. 13-16, the switches control diagnostics (switch 0), a selection of a display mode (switch 1), a selection of charging current (e.g., a two amp, ten amp, or an engine start condition; switch 2), and an identification of a battery type (switch 3).

At act 1304, test diagnostics commence. Test automation software resident to a memory within or coupled to a control logic performs various hardware and software tests. If a problem is found, the software may alert the user through an audio or visual warning, often accompanied by a diagnostic message.

At act 1308, the exemplary method determines if a timer generated an interrupt. If an interrupt was received, the exemplary method suspends its current operations and transfers control to an interrupt handler that directs the exemplary method to act 1310.

At act 1310, a system that generates a continuous train of pulses is reset, before returning to act 1306.

At act 1312 the exemplary method determines if an interrupt that bypasses and takes priority over interrupt requests generated by software and other such devices was generated. If a nonmaskable interrupt is generated, the exemplary method suspends its current operations and transfers controller to an interrupt handler that directs the exemplary method to act 1314.

At act 1314 and 1316, the exemplary method measures and writes a battery voltage to a memory and resets a charging time.

At act 1318, an autopolling process determines the status of a first switch. If a first switch is actuated, a user may customize a display or an interface to their personal or desired specification at act 1320.

At act 1322, an autopolling process determines the status of a second switch. If a second switch is actuated, a user may select a maximum charge rate or program a charge sequence that may include a bulk charge, an absorption charge, a float charge, an equalization charge, or a start charge mode at act 1324. At act 1326, the exemplary method sets a state variable to 0.

At act 1328, an autopolling process determines the status of a third switch. If a third switch is actuated, a user may identify a battery type. At act 1332, the exemplary method sets a state variable to 0.

At act 1334, the exemplary method determines if a battery voltage exceeds a predetermined threshold. In this exemplary method, if the battery voltage is less than about one volt, the exemplary method returns to act 1306.

At act 1336, the exemplary method determines if a state has been set. If a state has been set, the exemplary method determines the status of the battery at act 1402.

At act 1402, the exemplary method determines if a battery voltage lies within a predetermined threshold. In this exemplary method, the processor determines if a battery's voltage is greater than about one volt but less than about seventeen volts. If the battery voltage lies within that threshold, the exemplary method disables the charging current at act 1404, clears the state variable at act 1406, and the exemplary method returns to act 1306.

At act 1408, the exemplary method determines if the state variable has been set to 0. If the state variable has been set to 0, the exemplary method determines if an engine coupled to the battery has been started at act 1410. If the engine has been started, at act 1412 the exemplary method sets the state variable to 16 at act 1412 and the exemplary method returns to act 1306. If the engine has not been started, the exemplary method sets charge rate variables at act 1414, sets the state variable to 1 at act 1416, and returns to act 1306.

At act 1418, the exemplary method determines if the state variable has been set to 1. If the state variable has been set to 1, the exemplary method initializes the ramp charging values at act 1420, sets the state variable to 2 at act 1422, and returns to act 1306.

At act 1424, the exemplary method determines if the state variable has been set to 2. If the state variable has been set to a 2, the exemplary method passes a charging current to the battery at act 1426, sets the state variable to 3 at act 1428, and returns to act 1306.

At act 1430, the exemplary method determines if the state variable has been set to 3. If the state variable has been set to 3, the exemplary method determines if the battery voltage has exceeded a predetermined threshold. At act 1432, the predetermined threshold is about nine volts.

If the predetermined threshold has been exceeded, at act 1434 the exemplary method sets the state variable to 4 and the exemplary method returns to act 1306. If the predetermined threshold has not been exceeded, the exemplary method determines if a charging time has exceeded a predetermined charging interval at act 1436.

At act 1436, the predetermined timing interval is about five minutes. If the predetermined charging interval has been exceeded, the exemplary method sets the state variable to 8 at act 1438 and returns to act 1306. If the predetermined charging interval has not been exceeded, the exemplary method returns to act 1306.

At act 1440, the exemplary method determines if the state variable has been set to 4. If the state variable has been set to 4, the exemplary method determines if the battery voltage has exceeded a predetermined threshold. At act 1442, the predetermined threshold is about twelve volts.

If the predetermined threshold has been exceeded, at act 1444 the exemplary method sets the state variable to 5 and the exemplary method returns to act 1306. If the predetermined threshold has not been exceeded, the exemplary method determines if the time has exceeded a predetermined charging interval at act 1436.

At act 1436, the predetermined timing interval is about four hours. If the predetermined charging interval has been exceeded, the exemplary method sets the state variable to 8 at act 1448 and returns to act 1306. If the predetermined charging interval has not been exceeded, the exemplary method returns to act 1306.

At act 1502, the exemplary method determines if the state variable has been set to 5. If the state variable has been set to 5, the exemplary method determines if a charging time has exceeded a predetermined charging interval at act 1504.

At act 1504, the predetermined timing interval is about five minutes. If the predetermined charging interval has been exceeded, the exemplary method determines if the initial charging voltage has exceeded a predetermined threshold at act 1506. At act 1506 the predetermined threshold is about 12.2 volts.

At act 1508, the exemplary method determines if the battery voltage has exceeded a predetermined threshold. At act 1508 the predetermined threshold is about 14.2 volts. If the battery voltage has exceeded about 14.2 volts, the state variable is set to 9 and the exemplary method returns to act 1306. If the battery voltage has not exceeded about 14.2 volts at act 1508, the exemplary method returns to act 1306.

If the charging time has not exceed five minutes at act 1504 or the initial charging voltage has not exceed about 12.2 volts at act 1512, the exemplary method determines if the charging voltage exceeds a predetermined threshold at act 1512. At act 1512, the predetermined threshold is about 14.2 volts. If the battery voltage has exceeded about 14.2 volts, the state variable is set to 14 and the exemplary method returns to act 1306. If the battery voltage has not exceeded about 14.2 volts, the state variable is set to 11 and the exemplary method returns to act 1306.

At act 1518, the exemplary method determines if the state variable has been set to 8. If the state variable has been set to 8, the exemplary method aborts the charging method at act 1520, displays a message at act 1520, clears the state variable at act 1524, and returns to act 1306.

At act 1526 the exemplary method determines if the state variable has been set to 9. If the state variable has been set to 9, the exemplary method initiates a desulfating method at act 1528.

At act 1528 the exemplary method determines if a charging time exceeded a predetermined charging interval. At act 1528 the predetermined timing interval is about five minutes.

If the predetermined charging interval has been exceeded, the exemplary method determines if the battery voltage has exceeded a predetermined threshold. At act 1532 the predetermined threshold is about 14.2 volts. If the battery voltage has exceeded about 14.2 volts, the state variable is set to 0 and the exemplary method returns to act 1306. If the battery voltage has not exceeded about 14.2 volts at act 1532 the exemplary method determines if a charging time exceeded a predetermined charging interval. At act 1536 the predetermined timing interval is about ten hours.

If the charging time exceeds about ten hours at act 1536, the state variable is set to 8 at act 1538 and the exemplary method returns to act 1306. If the charging time did not exceed about ten hours at act 1536, the exemplary method returns to act 1306.

At act 1540 the exemplary method determines if the state variable has been set to 11. If the state variable has been set to 11, the exemplary method monitors a rate of change of the battery's voltage over time at act 1542.

At act 1544 the exemplary method determines if a charging time exceeds a maximum charging interval. If the predetermined charging interval has exceeded a maximum threshold at act 1554, the exemplary method sets the state variable to 8 and returns to act 1306.

At act 1548, the exemplary method determines if the battery voltage exceeds a maximum threshold. If the battery voltage does not exceed a maximum threshold, the exemplary method sets the state variable to 12, and the exemplary method returns to act 1306. If the battery voltage exceeds a maximum threshold, the exemplary method determines if the battery maintains a constant voltage at act 1550. If the battery maintains a constant voltage at act 1550, the exemplary method returns to act 1306. If the battery does not maintain a constant voltage, the state variable is set to 12, and the exemplary method returns to act 1306.

At act 1554 the exemplary method determines if the state variable has been set to 12. If the state variable has been set to 12, the exemplary method monitors the rate of change of the battery's current over time at act 1556.

At act 1558 the exemplary method determines if the battery can drive a constant current or a minimum current. If the battery can drive a constant or a minimum current at act 1558, the exemplary method sets the state variable to 13 at act 1546 and returns to act 1306.

At act 1562 the exemplary method determines if a maximum charging time has exceeded a predefined maximum charging time. If the maximum charging time has lapsed and the exemplary method has not previously executed this branch instruction, the exemplary method reduces the charging voltage and increases the predefined maximum charging time by a predetermined time period at act 1564 and 1562. If the exemplary method previously executed the branch instruction at act 1564, the exemplary method sets the state variable to 13 and returns to act 1306.

If a maximum charging time has not exceeded a predefined maximum charging time at act 1562, the exemplary method returns to act 1306.

At act 1566 the exemplary method determines if the state variable has been set to 13. If the state variable has been set to 13, the exemplary method initiates an end of charge method at act 1568.

At act 1570 the exemplary method determines if a charging time exceeded a predetermined charging interval called an end of charge time. If the charging time has exceeded the end of charge time, the exemplary method set the state variable to 14 at act 1572 and returns to act 1306. If the charging time has not exceeded the end of charge time at act 1570, the exemplary method returns to act 1306.

At act 1574 the exemplary method determines if the state variable has been set to 14. If the state variable has been set to 14, the exemplary method maintains its charging state at act 1576 and returns to act 1306.

At act 1578 the exemplary method determines if the state variable has been set to 16. If the state variable has been set to 16, the exemplary method initializes an engine start routine at act 1580. At act 1582, the exemplary method initializes a charge. At act 1584, the exemplary method initializes the charge. At act 1584, the exemplary method delivers a high current output sufficient to start a vehicle. At act 1586, the exemplary method sets the state variable to 17 and returns to act 1306.

At act 1590 the exemplary method determines if the state variable has been set to 17. If the state variable has been set to 17, the exemplary method determines if the charging time has exceeded a predetermined charging interval at act 1592. At act 1592, the predetermined charging interval is about fifteen minutes. If the predetermined charging interval has exceeded about fifteen minutes, the exemplary method discontinues charging at act 1594, sets the state variable to 0 and returns to act 1306.

If the predetermined charging interval has not exceeded about fifteen minutes, the exemplary method determines if the battery drops a predetermined threshold when charging stops at act 1598. At act 1598 the threshold is about one volt. If the battery drops about one volt, the exemplary method sets the state variable to 19 and returns to act 1306. If the battery voltage does not drop about 1 volt, the exemplary method returns to act 1306.

At act 1602 the exemplary method determines if the state variable has been set to 19. If the state variable has been set to 19, the exemplary method determines if the charging time has exceeded a predetermined charging interval at act 1604. At act 1604, the predetermined charging interval is about eight seconds. If the predetermined charging interval is less than about eight seconds, the exemplary method sets the positive going state of a charging pulse to about eight seconds and then returns to act 1306. If the predetermined charging interval is less than about eight seconds, the exemplary method sets the state variable to 20 and returns to act 1306.

At act 1610 the exemplary method determines if the state variable has been set to 20. If the state variable has been set to 20, the exemplary method determines if the charging time has exceeded a predetermined charging interval at act 1612. At act 1612, the predetermined charging interval is about two hundred and forty seconds. If the predetermined charging interval is less than about two hundred and forty seconds, the exemplary method sets the positive going state of a charging pulse to about two hundred and forty seconds and then returns to act 1306. If the predetermined charging interval is less than about two hundred and forty seconds, the exemplary method sets the state variable to 16 and returns to act 1306.

Figure 17:
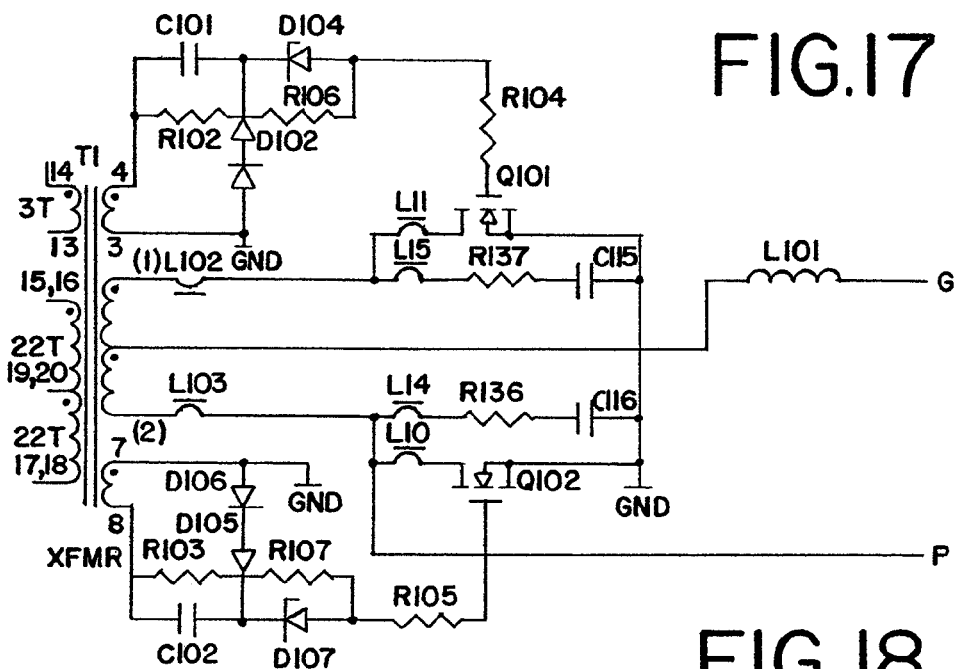
FIG. 17 illustrates a second exemplary synchronous converter of FIG. 3.

FIG. 17 illustrates a second exemplary synchronous converter that may be used with the exemplary systems and methods described above. In this alternative, Q101 and Q102 are connected across the secondary of transformer T1 and are referenced to ground. When a control signals are supplied to the secondary, such as when the gate of Q100 is high and the gate of Q102 is low, current flows through R102, R104, and R106 turning Q104 on, while Q102 is turned off. With Q101 turned on, current flows through Q101, L101, the center tap, and L101 to node G. Similarly, when the gate of Q102 is driven high, the gate of Q101 is driven low and current flows through Q102, L103, the center tap, and L101 to node G. Like the above-described embodiments, node P supplies power to a five-volt regulator U3 (FIG. 8) that may supply power to digital circuitry and other external loads when needed.

Figure 18:
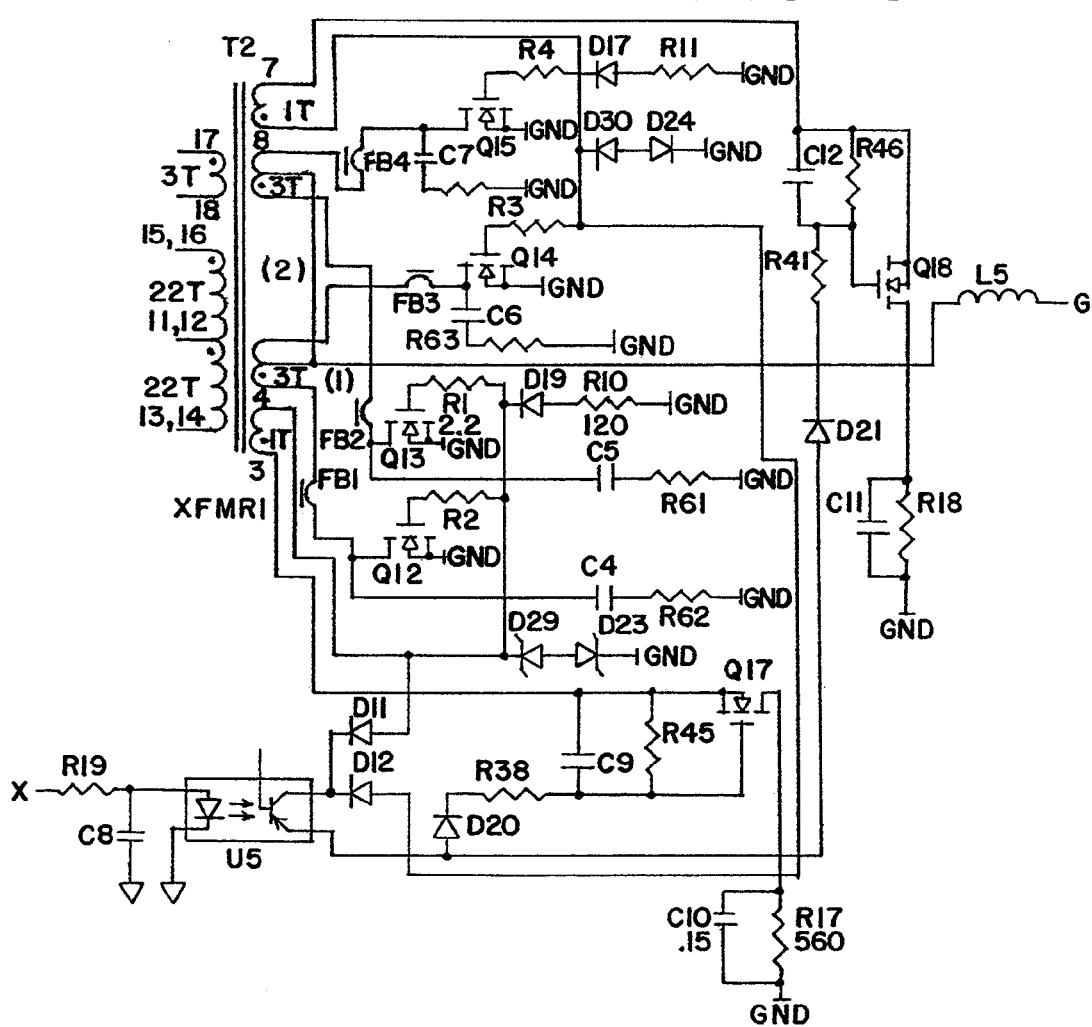
FIG. 18 illustrates a third exemplary synchronous converter of FIG. 3.

FIG. 18 illustrates a third exemplary synchronous converter that may be used with the exemplary systems and methods described above. In this exemplary alternative, the synchronous converter may sense when the AC source is disconnected from the high frequency battery charger.

As shown, node X monitors the AC line through an optical isolation. When an AC source is present Q17 and Q18 are biased on allowing the synchronous rectifier transistors Q12-Q15 to rectify the stepped down voltage. If the AC source is interrupted, Q17 and Q18 are biased off which turns offs the synchronous rectifier transistors Q12-Q15 regardless of a secondary bias. In FIG. 18, multiple synchronous rectifier transistors are used which allows the high frequency battery charger to deliver a higher current to an external load. In this configuration, two or more parallel synchronous rectifier switches also may be used in alternative embodiments to deliver more or less current.

Figure 19:
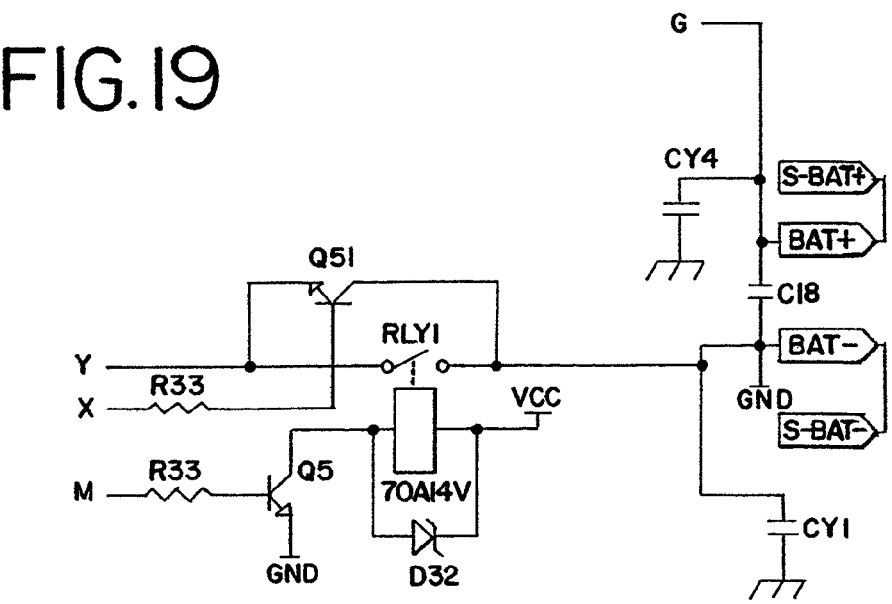
FIG. 19 illustrates a second exemplary output of FIG. 3.

FIG. 19 illustrates an alternative exemplary output that may be used with the exemplary systems and methods described above. In this alternative, a transistor Q51 is coupled in parallel to a high current output switch which may be a relay. The relay allows a relatively low power signal received at node M, to route a high-current to an external load, such as a battery. A high resolution output is achieved by connecting the base of transistor Q51 to a pulse width modulated source through node X. The frequency and/or duration of the pulses that drive transistor Q51 may provide a large or unlimited control of the level of charging current delivered to an external load. Although such control may be used in an absorption charge, absolute charge, a float charge, or equalization charge mode as shown, when the emitter of Q51 is coupled to a separate or secondary charge source, the high resolution control may also be used in a bulk charge or start charge mode.

In one exemplary embodiment, a processor and/or a pulse width modulator drive the bases of Q51 and Q5. In this embodiment, node Y may be connected to a negative output of the secondary of transformer T1 and node G may be connected to a positive output of the secondary of transformer T1.

Figure 20:
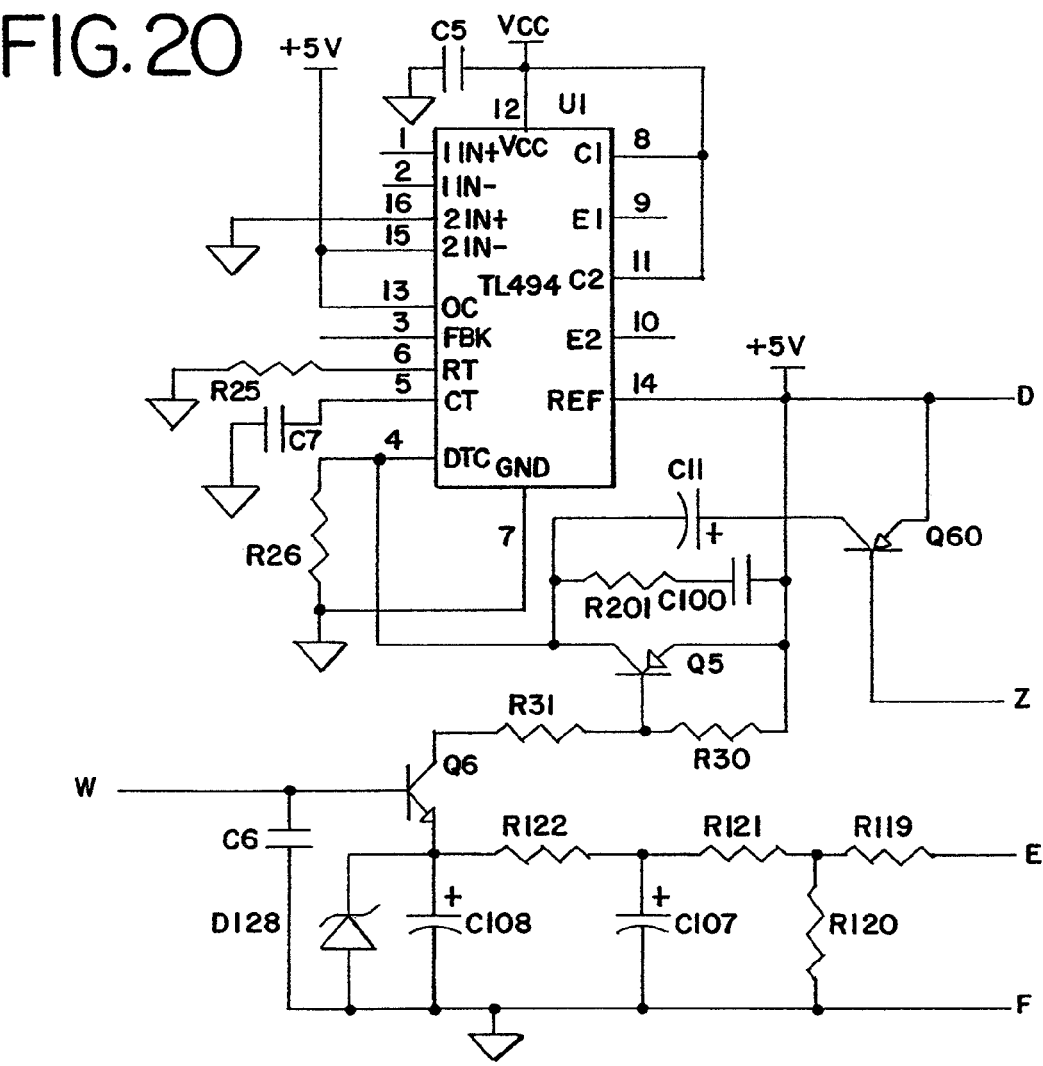
FIG. 20 illustrates a partial second exemplary drive circuit of FIG. 3.

FIG. 20 illustrates a partial alternative exemplary drive circuit that may be used with the exemplary systems and methods described above. In one exemplary embodiment, FIG. 20 may replace U1, C6, C107, C108, R121, R122, R30, R31, C11, Q5 and Q6 of FIG. 5, with node Z coupled to a control circuit or processor and node W coupled to R123.

In this partial alternative drive circuit, a switch Q5 controls the response time of the drive logic by switching a capacitor C11 into and out of circuit. When there is a need for the high frequency battery charger to respond quickly to current transients or continuous high current conditions, Q60 is biased off. With Q60 turned off, C11 is removed from the circuit, which lowers the time constant associated with the dead time control (DTC) input of the pulse width modulator U1. When protection against current spikes, transients and/or other conditions that require a fast response is needed, the dead-time control can be set or programmed to provide from 0% to about 100% dead time.

In normal operating conditions, Q60 is biased on bringing C11 in circuit. With C11 in circuit, the dead time control unit provides a small dead time by connecting C11 to R26. In an exemplary embodiment, Q60 is biased on when the exemplary high frequency battery charger is sourcing or driving a small charging current to an external load. The addition of the capacitor makes the drive logic more stable to current transients. In a low current charging mode, a spark may not be dangerous to a user because the high frequency battery charger may not be sourcing a continuous or a transitory high current. Thus, there may not be a need to dampen or turn off the output of the high frequency battery charger.

However, when the high frequency battery charger is sourcing a high current, such as a bulk or starting current, the exemplary drive circuit may require a more responsive dead time control to improve the frequency response of the pulse width modulator U1 and the high frequency battery charger. In high current sourcing conditions, there may be a need to respond more quickly to current variations and current spikes by shutting down the output of the exemplary high frequency battery charger.

The exemplary systems and methods convert an AC-line voltage to a high frequency square wave, which is then transformed into a desired DC voltage level through a single high frequency transformer. In some alternative exemplary battery chargers two or more high frequency transformers may be used. In some exemplary high frequency battery chargers, the multiple high frequency transformers operate contemporaneously to generate a charging current. In other exemplary high frequency battery chargers, separate high frequency transformers operate exclusively to generate different charging current according to a selected charging mode.

Many other alternatives are also encompassed within the embodiments. These embodiments may select between different battery types, detect voltage drops when determining when to initiate an engine start mode; determine and display the charge level or percentage charge level of a battery during a test or a charge mode; determine and display the remaining charge time in a charging cycle; calculate and display the amount of current or charge flowing to the battery (e.g., through a digital current value); have an automatic start and stop charging capability that may be initiated when power is interrupted; have an automatic voltage (e.g. 6 or 12 volts) or battery type detection, have a variable overtime fault detection; compare measured battery voltages in different time intervals to detect battery faults and have a current ramping function to charge a battery quickly. In addition each of the embodiments described above may include ground and output filters or noise filters having cutoff frequencies or pass bands that limit the transmission of radio frequency signals.

The above-described high frequency battery chargers describe many features and functions. In any one of the above-described exemplary battery chargers, any combination of features and functions may be included within any of the exemplary high frequency battery chargers or methods illustrated in the drawings or described above. Moreover, while the exemplary high frequency battery chargers have been described in automotive and marine applications, the invention may be used in any other application. Each application may use separate monitoring cables to monitor a charging current and voltage passed to the load or connect the monitoring cables with the respective charging outputs as shown in FIG. 7.

The above-described battery chargers may interface many networks, such as a publicly accessible (e.g., Internet) or a privately accessible network (e.g., WAN, LAN). The battery chargers may also interface one or more in-vehicle data networks. Such networks may include multiple Assembly Line Data link (ALDL) buses, Entertainment and Comfort buses (E&C), Controller Area Networks (CAN), or a combination of any in-vehicle data network. When connected to an in-vehicle data network, the above-described battery chargers may accept and/or issue commands, monitor vehicle or battery charger functions, and enable vehicle and charger functionality. Moreover, like the equalization charge, the bulk charge mode, the absorption or acceptance charge mode, and the float or trickle charge mode may provide a continuous or analog charge or a series of pulse charges of constant or varying amplitude in some exemplary high frequency battery chargers. Such charges may reverse a buildup of contaminants that may build up on a battery's electrodes.

The systems and method described above provide highly efficient high frequency battery chargers that maintain the charging levels of a battery within a desired range. The systems and methods provide high frequency multi-stage charging to ensure that a battery reaches and sustains its full charge level. Depending on the battery type or a user's selection, a charging cycle of the system and method may be automatically terminated. The output of the high frequency charger is protected against short circuits, highly discharged batteries, and defective batteries. The high frequency battery chargers provide a pulse charge that may break up contaminants, chemicals, or sulfate layers that may build up on a battery's electrodes.

While some embodiments of the invention have been described, it should be apparent that many more embodiments and implementations are possible and are within the scope of this invention. It is intended that the foregoing detailed description be regarded as illustrative rather than limiting, and that it be understood that it is the following claims, including all equivalents, that are intended to define the spirit and scope of this invention.

What is claimed is:

1. A method of charging a rechargeable battery by way of a high frequency battery charger, the method comprising the steps of:
   (a) transforming an AC input into a first DC output;
   (b) transforming the first DC output into a high frequency AC output;
   (c) transforming the high frequency AC output into a second DC output;
   (d) sensing the voltage of said second DC output;
   (e) sensing the voltage of said rechargeable battery; and
   (f) passing a charging current to said rechargeable battery only when said rechargeable battery is correctly connected to said high frequency battery charger and said voltage of said second DC output and said voltage of said rechargeable battery exceed predetermined thresholds, and after passing said charging current to said rechargeable battery, continuing to monitor the voltage of the rechargeable battery and the voltage of said battery charger; comparing the voltage of the rechargeable battery with the voltage of said battery charger, generating a signal representative of a defective battery condition when a scaled value of said battery charger voltage exceeds a scaled value of the voltage of said rechargeable battery; automatically modifying predetermined charging cycle in response to said defective battery condition representative signal.

2. The method of claim 1 wherein the step of transforming the first DC input into a high frequency AC output comprises actuating a plurality switches coupled to a primary of a high frequency transformer.

3. The method of claim 1 further comprising the step of monitoring the charging current with a processor.

4. The method of claim 1 further comprising the step of providing a spark resistance when a load is connected in a reverse polarity.

5. The method of claim 1 wherein the act step of passing the charging current comprises passing the charging current onto a battery only when the charging current is below a predetermined threshold.

6. The method of claim 1 wherein the charging current comprises a pulsating current.

7. The method as recited in claim 1, wherein step (f) includes:
   automatically terminating said charging cycle in response to said defective battery condition representative signal.

* * * * *